(12) United States Patent
Tanizawa et al.

(10) Patent No.: US 7,751,476 B2
(45) Date of Patent: *Jul. 6, 2010

(54) MOVING PICTURE CODING METHOD AND MOVING PICTURE CODING APPARATUS

(75) Inventors: Akiyuki Tanizawa, Kanagawa (JP); Shinichiro Koto, Tokyo (JP); Takeshi Chujo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1535 days.

This patent is subject to a terminal disclaimer.

(21) Appl. No.: 11/016,803

(22) Filed: Dec. 21, 2004

(65) Prior Publication Data

US 2005/0157784 A1 Jul. 21, 2005

(30) Foreign Application Priority Data

Dec. 24, 2003 (JP) .............................. 2003-427893

(51) Int. Cl.
H04N 7/12 (2006.01)
H04N 11/02 (2006.01)
H04N 11/04 (2006.01)

(52) U.S. Cl. .............................. 375/240.03; 375/240.24
(58) Field of Classification Search ............ 375/240.16, 375/240.24, 240.03
See application file for complete search history.

(56) References Cited

U.S. PATENT DOCUMENTS

| 5,963,673 | A | * | 10/1999 | Kodama et al. ............. 382/239 |
| 7,236,524 | B2 | * | 6/2007 | Sun et al. ................ 375/240.12 |
| 7,333,660 | B2 | * | 2/2008 | Koto ........................... 382/238 |
| 2004/0013202 | A1 | * | 1/2004 | Lainema ................. 375/240.18 |
| 2004/0057515 | A1 | * | 3/2004 | Koto et al. ............. 375/240.14 |
| 2005/0157784 | A1 | * | 7/2005 | Tanizawa et al. ....... 375/240.03 |

FOREIGN PATENT DOCUMENTS

| JP | 9-322176 | 12/1997 |
| JP | 10-290464 | 10/1998 |
| JP | 2003-153280 | 5/2003 |

OTHER PUBLICATIONS

U.S. Appl. No. 10/991,379, filed Nov. 19, 2004, Shinichiro Koto.

* cited by examiner

Primary Examiner—Marsha D Banks Harold
Assistant Examiner—Jessica Roberts
(74) Attorney, Agent, or Firm—Oblon, Spivak, McClelland, Maier & Neustadt, L.L.P.

(57) ABSTRACT

In an embodiment of the invention, a method for coding a moving picture comprises: dividing an inputted picture signal into fractionized signals respectively corresponding a plurality of pixel blocks; generating a prediction signal and coding mode information from each of said fractionized signals, for each coding mode; generating a prediction residual signal, from the prediction signal and said each of fractionized signals; estimating a first-estimate coding cost that is for coding the prediction residual signals for said each coding mode, from the prediction residual signals and the coding mode information; determining a candidates' number in accordance with step width of quantizing; selecting the coding modes having smallest ones of the first-estimate coding costs as candidates; estimating a second-estimate coding cost by coding the inputted signal and thereby finding a coding distortion and a code amount; and employing one coding mode from the candidates on basis of the second-estimate coding cost.

6 Claims, 21 Drawing Sheets

FIG. 7A  VERTICAL PREDICTION

FIG. 7B  HORIZONTAL PREDICTION

FIG. 7C  DC PREDICTION

{(A+B+C+D) + (J+K+L+M)} /8

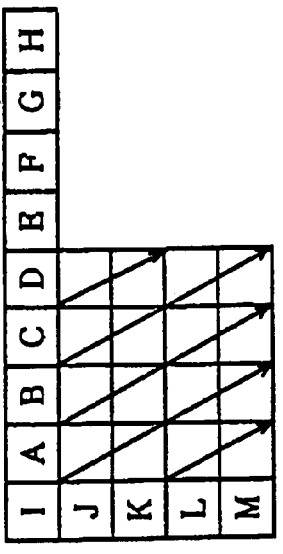
FIG. 7D  ORTHOGONAL LOWER-LEFTWARD PREDICTION
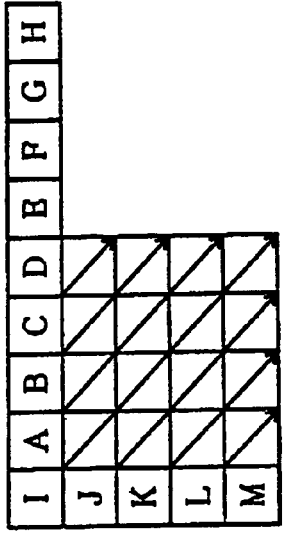
FIG. 7E  ORTHOGONAL LOWER-RIGHTWARD PREDICTION
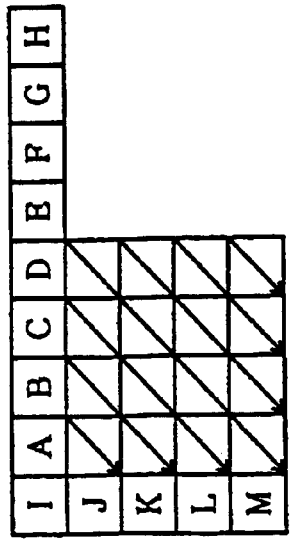
FIG. 7F  RIGHTWARD-SLANTED VERTICAL PREDICTION

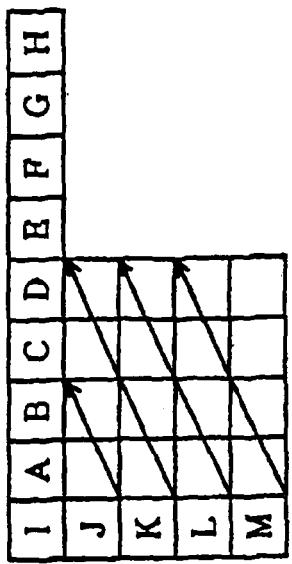
FIG. 7I UPWARD-SLANTED HORIZONTAL PREDICTION
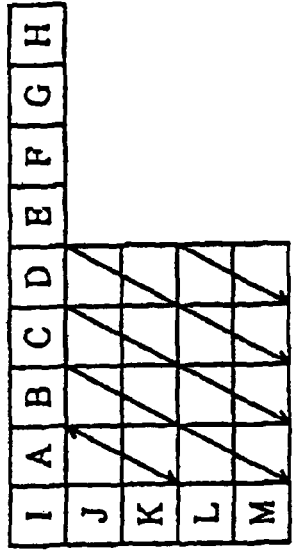
FIG. 7H LEFTWARD-SLANTED VERTICAL PREDICTION
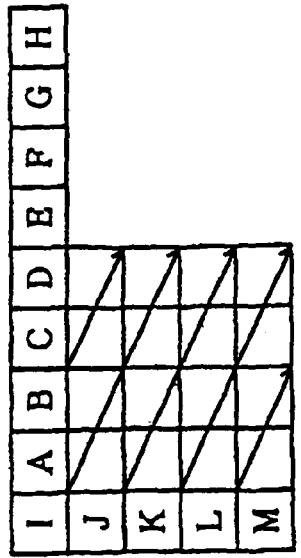
FIG. 7G DOWNWARD-SLANTED HORIZONTAL PREDICTION

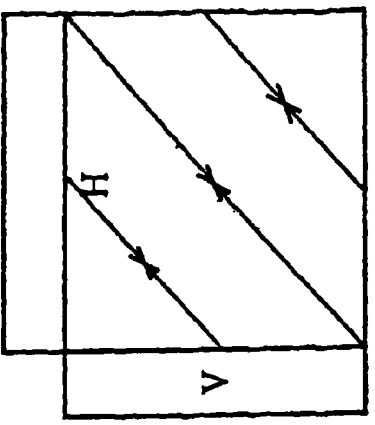
FIG. 8A  HORIZONTAL PREDICTION
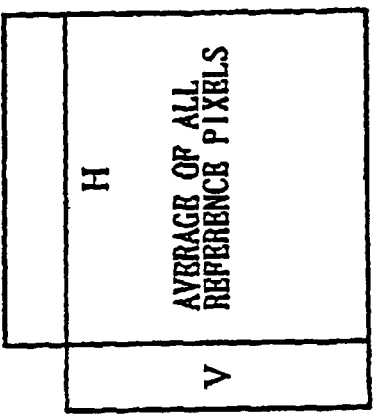
FIG. 8B  HORIZONTAL PREDICTION
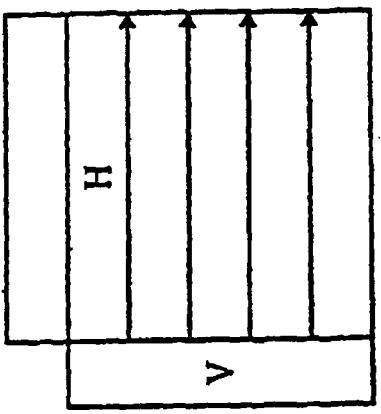
FIG. 8C  DC PREDICTION
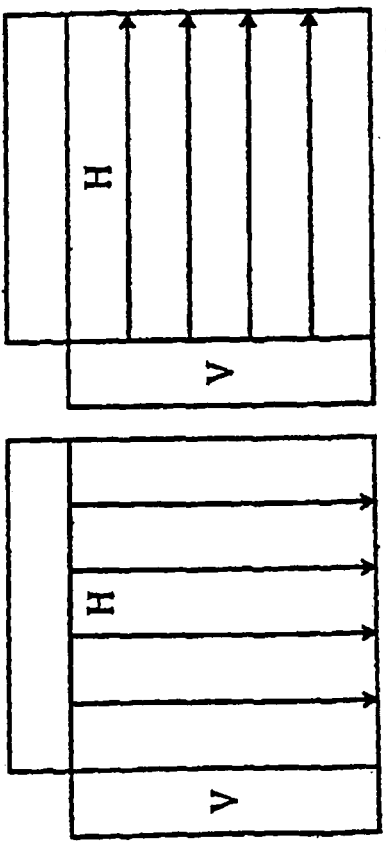
FIG. 8D  PLANE-WISE PREDICTION FIG.19
(A)
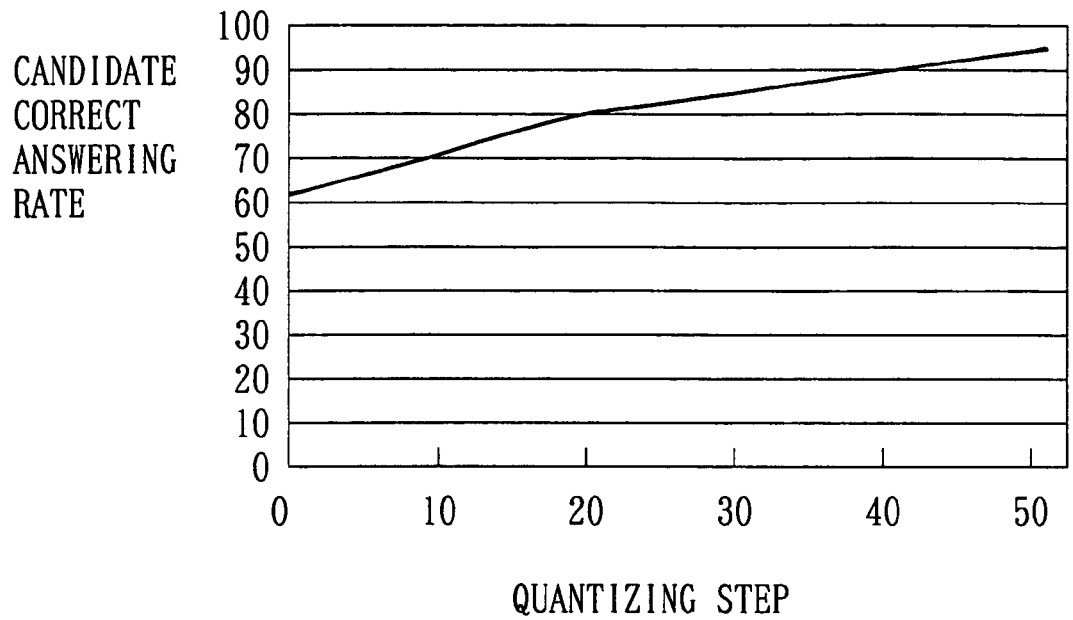
(B)
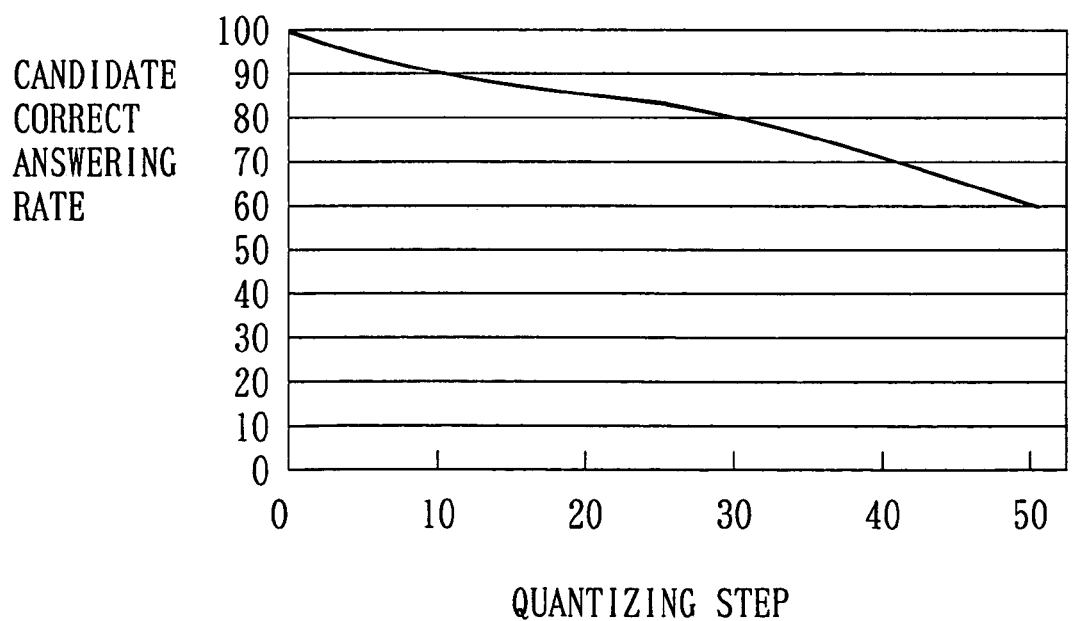

MOVING PICTURE CODING METHOD AND MOVING PICTURE CODING APPARATUS

CROSS-REFERENCE TO RELATED APPLICATIONS

This application is based upon and claims the benefit of priority from the prior Japanese Patent Application No. 2003-427893, filed on Dec. 24, 2003; the entire contents of which are incorporated herein by reference.

BACKGROUND OF THE INVENTION

1. Field of the Invention

The present invention is related to a method, an apparatus and a program for coding a moving picture by adopting one of coding modes.

2. Description of the Related Art

A moving picture coding method, which adopts a prediction coding system having a plurality of prediction modes and a plurality of block shapes, has been discussed in a joint committee of ITU-T and ISO/IEC as "ITU-T Rec. H. 264" and "ISO/IEC 14496-10" (hereinafter referred to as "H. 264").

In an in-frame prediction coding system of H. 264, either of a 4×4 prediction block and a 16×16 prediction block may be selected as a block shape for each prediction block. As used herein, in-frame refers to intra-frame. Moreover, one prediction mode may be selected from a plurality of prediction modes so as to execute a predicting operation. In the in-frame predicting systems of MPEG-1, MPEG-2, and MPEG-4, which correspond to the conventional coding system, prediction modes which may be selected are not so many. In H. 264, however, prediction blocks are as small as 16×16 pixel blocks and/or 4×4 pixel blocks, an optimum prediction mode may be selected from the great variety of prediction modes in correspondence with a feature of an image. In an inter-frame prediction coding system, predicting operations larger than, or equal to an 8×8 pixel block size has been conventionally employed. In H. 264, because predicting operations in a 4×4 pixel block size may be carried out, a predicting operation having precision higher than the conventional prediction method may be realized by motion compensation derived from plural sheets of reference images which have already been coded. As previously explained, a total number of these prediction modes is increased which may be selected for each block; and such a coding mode having a higher prediction efficiency is selected in order that the coding efficiency is improved.

Also, a rate-distortion-wise optimizing method has been proposed, in which while a generated code amount is employed as a constraint condition, a coding control operation is carried out by employing the Lagrange undetermined multiplying method.

This rate-distortion-wise optimizing method corresponds to such a method that a coding mode having the highest coding efficiency is selected based upon a generated code amount which is obtained by being actually coded and a coding error (for example, square error between original image and local decode image, mean square error thereof, and the like).

However, this rate-distortion-wise optimizing method owns the following problem. That is, when a total number of these coding modes and a total number of these block shapes are increased, the coding operations must be repeatedly carried out plural times which are equal to a total number of possible mode combinations, so that actual calculation time is increased.

It is important to properly select a coding mode for each pixel block; thus, various techniques for selecting the modes have been proposed:

(1) A method adopting a coding mode having a small prediction error. Please see JP-A-2003-153280 (Japanese Laid-open Patent Application NO. 2003-153280).

(2) A method by which a to-be-generated code amount is estimated based upon a prediction residual signal, or the like; and then, a coding mode is selected in such a manner that the to-be-generated code amount as estimated becomes minimum. Please see JP-A-10(1998)-290464 (Japanese Laid-open Patent Application NO. Hei-10-290464).

(3) A method by which coding operations are actually carried out as to respective coding modes, and then, such a coding mode is selected, the code amount of which is minimum. Please see JP-A-2003-153280and JP-A-9(1997)-322176 (Japanese Laid-open Patent Application NO. 2003-153280 and NO. Hei-9-322176).

(4) A method by which in addition to the above-described selecting method (3), a coding distortion is calculated for each coding mode; namely, an error between a decoded image and an original image is calculated with respect to each of these coding modes; and then, an optimum coding mode is selected by considering a balance between a generated code amount and a coding distortion. Please see Thomas Wiegand and Berand Girod "Multi-frame motion compensated prediction for video transmission", Kluwer Academic Publishers, 2001.

In the selecting methods (1) and (2), since the coding modes are selected based upon estimation and prediction, there are some possibilities that the selections of the coding modes are not properly made; and thus, the coding operations may not be carried out in a high coding efficiency.

In contrast, in the selecting methods (3) and (4), the selections of the coding modes are carried out based upon the code-amount measuring results obtained by the actual coding operations; thus, generally speaking, the coding operations is carried out in the higher coding efficiency. However, in the selecting methods (3) and (4), the coding operation must be actually carried out so as to actually measure the generated code amount with respect to each of the selectable coding modes. As a result, although the coding efficiencies is improved, in when not a few coding modes are employed, there is such a problem that; a calculation amount and a hardware scale are increased which are required for coding operations; and cost of encoders increases.

In view of the above, it is aimed to provide a moving picture coding method and a moving picture coding apparatus, capable of selecting a suitable coding mode when any one coding mode is selected from a plurality of coding modes so as to code a moving picture, while suppressing an increase in processing loads and the like.

BRIEF SUMMARY OF THE INVENTION

According to an embodiment of the invention, a method for coding a moving picture comprises: dividing an inputted picture signal into fractionized signals respectively corresponding a plurality of pixel blocks; generating a prediction signal and coding mode information from each of said fractionized signals, for each one of coding modes that is for coding one of the pixel blocks; generating a prediction residual signal for said each one of the coding modes, from the prediction signal and said each of fractionized signals; estimating a cost for coding the prediction residual signals for said each one of coding modes, from the prediction residual signals and the coding mode information in respect of said one of the pixel blocks, as to give a first-estimate coding cost; determining a candidates' number in accordance with a step width of quantizing that is for coding the prediction residual signal in respect of said each one of coding modes; sorting the first-estimate coding costs in an increasing order from smallest one; selecting the coding modes having smallest ones of the first-estimate coding costs as to determine coding mode candidates as many as said candidates' number; coding the inputted signal and thereby finding a coding distortion and a code amount for each of the coding mode candidates, as to estimate a respective second-estimate coding cost that is more precice than the first-estimate coding cost; and employing one coding mode from the coding mode candidates on basis of the second-estimate coding cost, as to code said one of the pixel blocks.

By such embodiments, increase in the processing loads and the like is curbed and optimum mode for coding is adoptable when to code a moving picture by adopting one among plurality of the coding modes.

BRIEF DESCRIPTION OF THE DRAWINGS

FIGS. 7A-7I are a set of diagrams for indicating prediction modes in 4×4 pixels in H. 264, according to the second embodiment.

FIGS. 8A-8D are a set of diagrams for indicating prediction modes in 16×16 pixels in H. 264, according to the second embodiment.

FIG. 19A and FIG. 19B are graphs for graphically representing a relationship between quantizing steps and candidate correct answering rates according to the first embodiment.

DETAILED DESCRIPTION OF THE INVENTION

Referring now to attached drawings, best embodiment modes of a moving picture coding method and a moving picture coding apparatus, according to the present invention, will be described in detail.

First Embodiment

Figure 1:
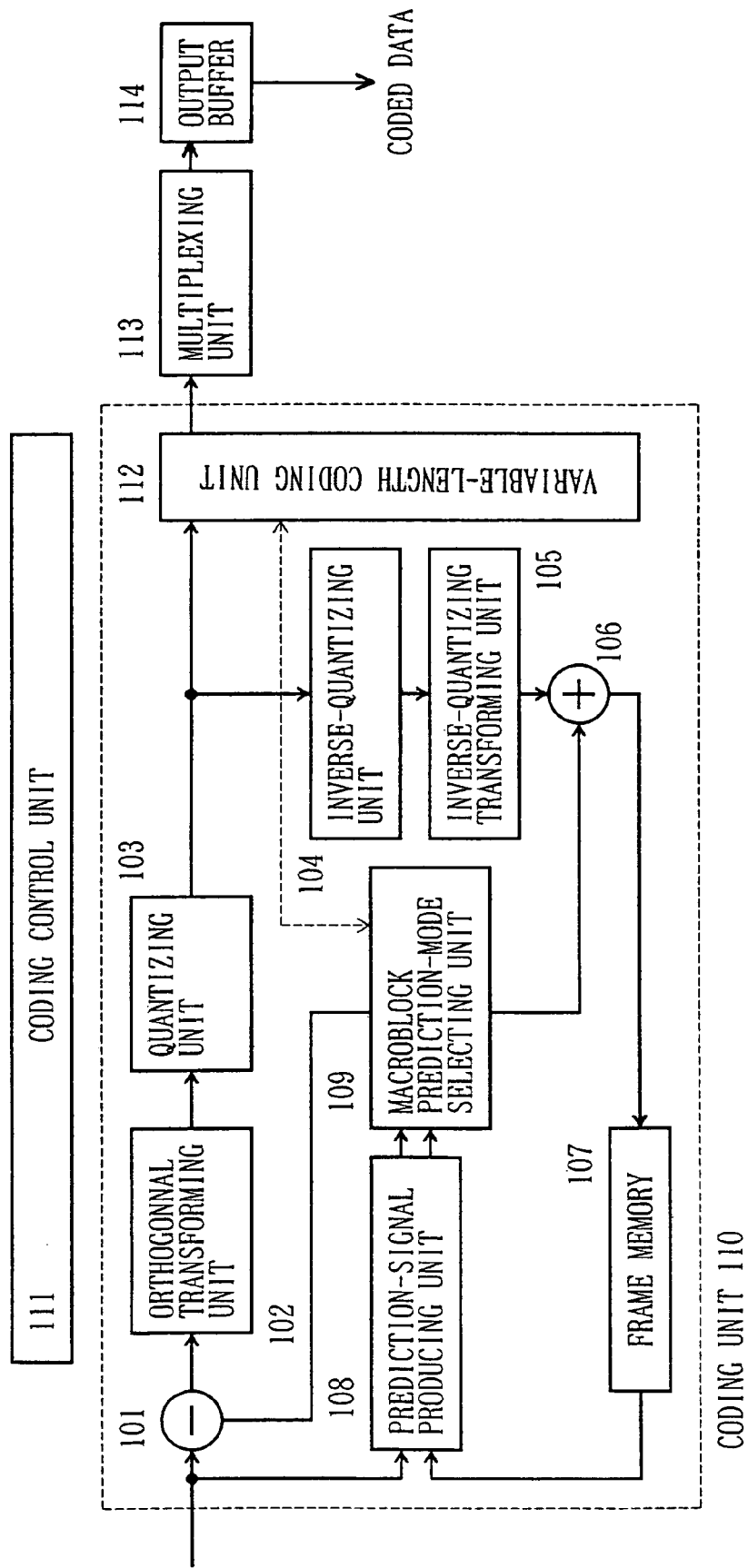
FIG. 1 is a schematic block diagram for indicating an arrangement of a moving picture coding apparatus according to a first embodiment of the invention.

FIG. 1 is a block diagram for schematically showing an arrangement of a moving picture coding apparatus according to a first embodiment of the present invention.

(1) Arrangement of Moving Picture Coding Apparatus

In the moving picture coding apparatus of FIG. 1, a moving picture signal is inputted to a coding unit 110. A subtracter 101 of this coding unit 110 is connected via an orthogonal transforming unit (for example, discrete cosine transforming device) 102 and a quantizing unit 103 to a variable length coding unit 112. The orthogonal transforming unit 102 orthogonally transforms an input signal (moving picture signal). The quantizing unit 103 quantizes an orthogonal transforming coefficient (DCT coefficient). An output terminal of the quantizing unit 103 is connected via an inverse quantizing unit 104, an inverse orthogonal transforming unit 105, and an adder 106, which constitute a local decoding device, to a frame memory 107. An output terminal of the frame memory 107 is connected to an input terminal of a prediction-signal producing unit 108 that will be discribed later. An output terminal of the prediction-signal producing unit 108 is connected to a macroblock (MB) prediction-mode selecting unit 109 that will be discribed later. An output terminal of this macroblock prediction-mode selecting unit 109 is connected to both of the subtracter 101 and the adder 106.

An output terminal of the variable-length coding unit 112 is connected via a multiplexing unit 113 to an output buffer 114. A coding control unit 111 is provided in order to control the coding unit 110.

In the above-described arrangement, the inputted moving picture signal is divided into fractions or parts respectively corresponding a plurality of pixel blocks; and then, each of such fractionized signals is entered to the prediction-signal producing unit 108 individually. In the prediction-signal producing unit 108, an optimum prediction mode is selected from a plurality of prediction modes by employing a reference frame stored in the frame memory 107; and a prediction (pixel) signal is produced by employing the selected prediction mode. Based upon the prediction signal, an optimum prediction mode is selected by the macroblock prediction mode selecting unit 109. In other words, based upon the prediction signal which has been produced by the prediction-signal producing unit 108 in accordance with the selected optimum prediction mode, the macroblock prediction mode selecting unit 109 selects one among an inter-frame prediction mode and an in-frame prediction mode. Such a prediction signal corresponding to the selected prediction mode is entered to the subtracter 101. A prediction residual signal between the prediction pixel signal and the inputted image signal is calculated by the subtracter 101. This prediction residual signal is inputted to the orthogonal transforming unit 102 so as to be orthogonally transformed (for example, DCT transformation).

The orthogonal transforming coefficient is quantized by the quantizing unit 103; and then, the variable-length coding unit 112 executes variable-length-wise coding of the quantized orthogonal transforming coefficient; as well as of the information related to the predicting method such as the prediction mode information and the quantizing coefficient, which are outputted from the macroblock prediction mode selecting unit 109. These coded data are multiplexed by the multiplexing unit 113; and then, the multiplexed coded data are outputted through the output buffer 114 as coded data.

Meanwhile, the quantized orthogonal transforming coefficient is locally decoded through both the inverse quantizing unit 104 and the inverse orthogonal transforming unit 105. The locally decoded signal, namely, the decoded prediction residual signal is added to the prediction signal in the adder 106, and then, the decoded prediction residual signal thus added is stored into the frame memory 107 as the reference frame.

The coding control unit 111 performs; a feedback control operation and a quantizing feature control operation of a generated code amount; and a rate control for controlling the generated code amount; and controls the predicting unit as well as the entire coding operation.

It should be understood that the functions of these respective units may be realized in accordance with a program stored in a computer.

(2) Coding System

Figure 2:
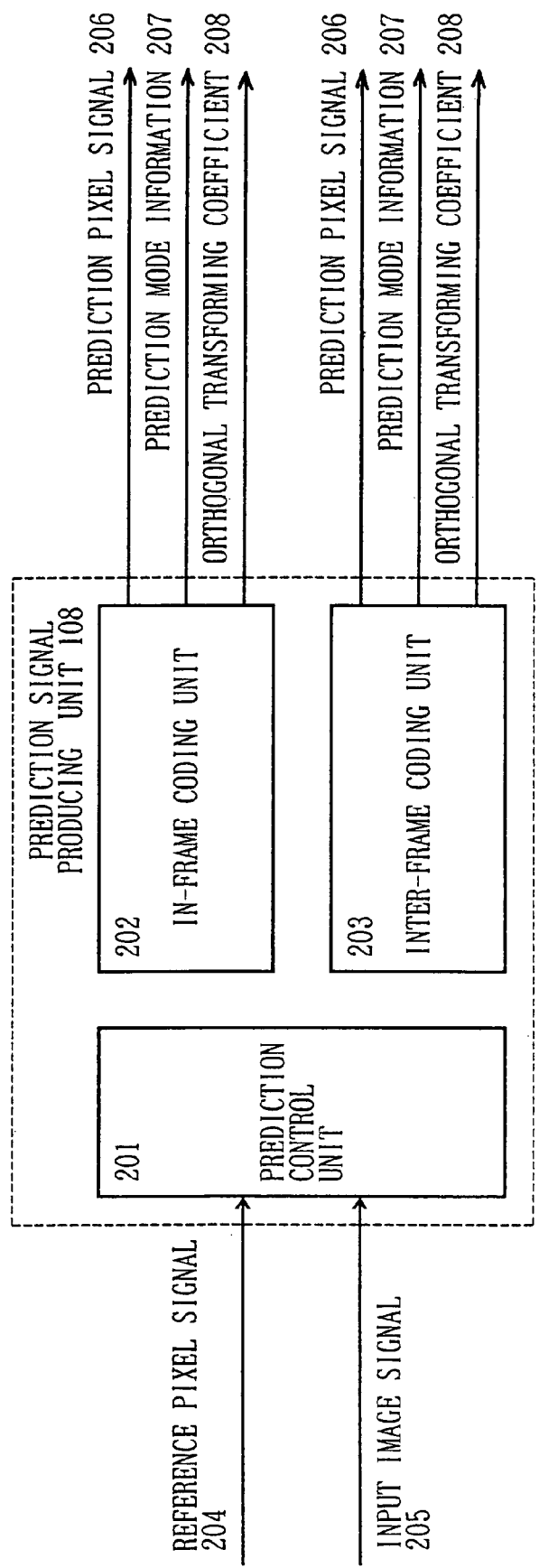
FIG. 2 is a schematic block diagram for showing an internal arrangement of a prediction signal producing unit employed in the moving picture coding apparatus according to the first embodiment.

Next, a concrete description is made of the coding system with reference to FIG. 2.

In this first embodiment, the macroblocks have respective block shapes varied with each other and have respective prediction modes.

(2-1) Explanation of Operation as to Prediction Signal Producing Unit 108

FIG. 2 shows an internal arrangement of the prediction signal producing unit 108.

The prediction signal producing unit 108 is controlled by the coding control unit 111. When an input image signal 205 is to be coded in a certain coding mode, both the input image signal 205 and a reference pixel signal 204 that has been stored in the frame memory 107 of FIG. 1 are entered to a prediction control unit 201.

The prediction control unit 201 inputs the reference pixel signal 204 and the input image signal 205 to either an in-frame coding unit 202 or an inter-frame coding unit 203 in response to either picture type information or slice type information, which are supplied from the coding control unit 111.

Each of the in-frame coding unit 202 and the inter-frame coding unit 203 executes coding processing to output a prediction pixel signal 206, a prediction mode information 207, and an orthogonal transformation coefficient 208.

(2-2) Explanation as to Operations of In-Frame Coding Unit 202 and Inter-Frame Coding Unit 203

Figure 3:
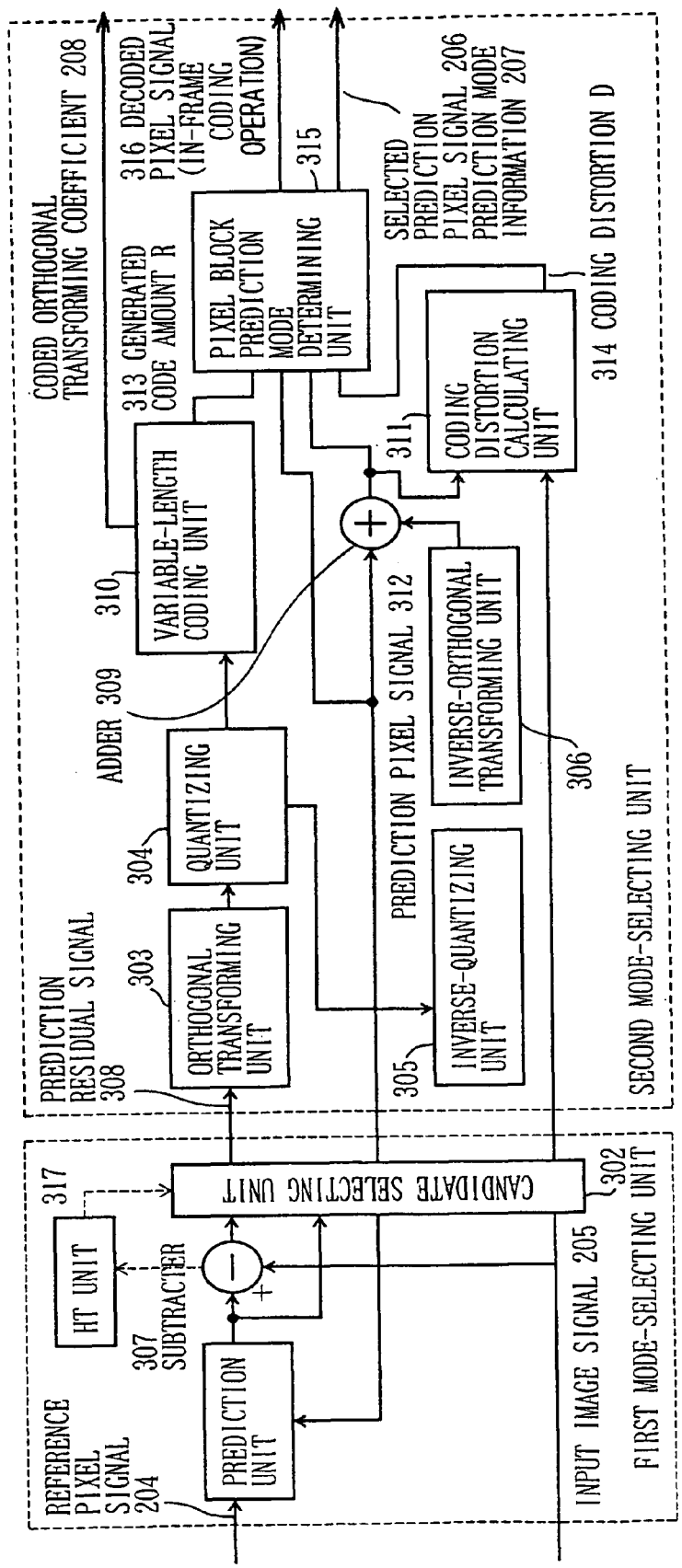
FIG. 3 is a schematic block diagram for showing a detailed internal arrangement of the prediction signal producing unit employed in the moving picture coding apparatus according to the first embodiment.

FIG. 3 indicates an internal arrangement of either the in-frame coding unit 202 or the inter-frame coding unit 203 shown in FIG. 2.

The reference pixel signal 204 given in FIG. 2 is entered to a predicting unit 301 so as to produce a prediction pixel signal 312. The prediction pixel signal 312 predicted in the above-described coding mode is subtracted from the input image signal 205 by the subtracter 307 to become a prediction residual signal 308. Then, this prediction residual signal 308 is entered to a candidate selecting unit 302. The candidate selecting unit 302 selects a prediction mode for coding by use of the prediction pixel signal 312 and the input pixel signal 205. At the same time, the prediction pixel signal 312 is also entered to the candidate selecting unit 302.

Alternatively, the prediction residual signal 308 may be entered to an Hadamard transforming unit (will be referred to as "HT unit" hereinafter) 317 so as to be Hadamard-transformed to obtain a transformed difference signal which may be entered to the candidate selecting unit 302.

The prediction residual signal 308 is orthogonally transformed by the orthogonal transforming unit 303, whereas the transformation coefficient is quantized by a quantizing unit 304. The quantized transformation coefficient is variable-length-wise coded as to be outputted as bit stream data. Meanwhile, a generation coding amount R313 which has been measured when such variable-length coding is inputted to a pixel block prediction mode determining unit 315.

On the other hand, the transforming coefficient which has been quantized by the quantizing unit 304 is inverse-quantized by the inverse quantizing unit 305; and further, the orthogonal transforming coefficient 208 is inverse-transformed by the inverse orthogonal transforming unit 306 to become a quantized residual signal. Then, the quantized residual signal is added to a prediction pixel signal 312 by an adder 309 to become a decoded pixel signal 316.

In a pixel block prediction mode determining unit 315, a Lagrange cost of each of the prediction modes is calculated by employing the Lagrange undetermined multiplying method based upon both the generated code mount R313 measured by the variable length coding unit 310 and a coding distortion D314 measured by a coding distortion calculating unit 311; such a prediction mode that the Lagrange cost thereof becomes minimum is selected as an optimum prediction mode; and both the prediction mode information 207 at such occasion and the coded orthogonal transforming coefficient 208 are coded, and then multiplexed with each other.

(3) Mode Judging Process Operation

A rate-distortion-wise optimization based upon the Lagrange undetermined multiplying method is employed for mode judging in the macroblock prediction-mode selecting unit 109 of FIG. 1 and also in the pixel-block prediction-mode determining unit 315 of FIG. 3.

In following equation, it is so assumed that; "J" denotes a Lagrange cost, "R" denotes a generated code amount, and "D" denotes a coding distortion. Symbol "λ" denotes a Lagrange multiplier, which depends upon a quantizing step.

$$J = D + \lambda R \qquad \text{[Formula 1]}$$

The Lagrange undetermined multiplying method is a technique for converting a maximizing problem having a certain constraint condition to that having no constraint condition.

The coding distortion "D" is calculated as a square error between the decoded pixel signal 316 and the input image signal 205. The decoded pixel signal 316 is obtained in such a manner that; the prediction residual signal 308 is orthogonally transformed, quantized, inverse-quantized, and inverse-orthogonal-wise transformed, and then, the resulting prediction residual signal is added to the prediction pixel signal 312. When provided with a plurality of modes or a plurality of block shapes, calculation load is increased because the generated code amount "R" is obtained after being variable-length-wise coded by employing the orthogonal transformation coefficient just after being quantized.

A first mode-judging unit calculates a prediction residual signal 308 of each pixel block, by use of the inputted image signal and the prediction pixel signal predicted for a coding mode, in respect of the each pixel block. A plurality of prediction modes are estimated by employing an absolute error value (SAD) of thus calculated prediction residual signal 308 and sub-information during the coding operation. This first embodiment is featured by that an optimum coding mode is selected from thus obtained prediction coding modes. Hence, a total number of the prediction modes as selected may be varied and set with respect to each block shape or each coding mode.

In respect solely of certain prediction modes that have been selected as an optimum candidate group, a second mode-judging unit is required to execute the orthogonal transforming operation, the quantizing operation, the inverse quantizing operation, the inverse orthogonal transforming operation, and the coding operation. Thus, omitted are the orthogonal transforming operation, the quantizing operation, the inverse quantizing operation, the inverse orthogonal transforming operation, the coding operation within the prediction mode loop and the like. Hence, the calculation amounts in the variable length coding unit 310 and the coding distortion calculating unit 311 are largely reduced.

In the above, an absolute error of the prediction residual signal 308 with respect to a prediction mode "i" may be calculated in accordance with the following formula 2:

$$SAD_i = \sum_{k=A} |O_k - P_k^i| \quad \text{[Formula 2]}$$

symbol "$O_k$" indicates input pixel signal, and symbol "$P_k^i$" shows a prediction image signal which has been predicted in prediction mode "i";

In this formula 2, symbol "k" indicates a pixel number within a macroblock. For example, in the case that an in-frame coding operation of H. 264 is selected, code amounts for coding the above-described coding mode information are different from each other, depending upon coding modes. In an inter-frame coding operation, a code amount in respect of respective coding mode varies with block shapes, reference frame numbers, and selected macroblock. Such sub-information is taken as a rough-estimate code amount for expressing a rough-estimate coding cost, which is a counterpart of an elaborate-estimate coding cost. Such sub-information is used in a formula at below for determining a mode and indicates a code amount at a selected coding mode.

$$\text{Cost}_i = SAD_i + \lambda_{\text{effect}} \times \text{sub-information}_i \quad \text{[Formula 3]}$$

In this formula 3, symbol "$\lambda$ effect" denotes a Lagrange multiplier, value of which is different from that represented by symbol "$\lambda$" of the formula 1.

With respect to the respective prediction modes "i", rough-estimate coding costs are calculated; and then, a candidate selection is carried out from the rough-estimate coding costs. At the first mode-selecting unit in FIG. 3, coding is omitted for not-selected prediction modes, so that projected is a drastic reduction of calculation amount. Furthermore, the rough-estimate coding cost may be calculated from a prediction residual signal and the rough-estimate code amount, which do not depend upon such a coding mode as an in-frame coding mode and an inter-frame coding mode. As a consequence, a cost reduction as to hardware related to mounting and developing of this moving picture coding system is realized.

(4) Method of Selecting Coding Mode Candidate

A description is made of the first embodiment related to a selection of a coding mode candidate.

In this first embodiment, a total number of candidates which are selected in response to a quantizing step width may be adaptively changed.

As an example of predicting a elaborate-estimate coding cost every coding mode, the above-described rough-estimate coding cost is calculated, and a total number of candidates which are adaptively selected in response to a value of a cost is changed. In this case, a judgement as to whether a rough-estimate coding cost-is large, or small is carried out based upon a value of a quantizing step.

For instance, when a rough-estimate coding cost of one coding mode calculated based upon a certain quantizing step is largely smaller than a rough-estimate coding cost of another coding mode, it is so judged that the first-mentioned coding mode is suitable, and then, the rough-estimate coding cost of the last-mentioned coding mode is not calculated.

On the other hand, in such a case that any of calculated rough-estimate coding costs of coding modes take similar values, these coding modes are left as candidates, and the first mode judging operation is completed.

As a consequence, in the second mode judging operation, a Lagrange cost is calculated, and a rate-distribution optimization is carried out, so that an optimum coding mode is selected.

As previously explained, the rough-estimate coding costs are calculated, and then, a total number of the candidates which are adaptively selected in response to the calculated cost values is adjusted or varied, so that the moving picture can be coded in a high speed without lowering the coding efficiency.

A method of selecting a coding mode candidate will now be explained in more detail.

(4-1) First Selecting Method

A first selecting method of a coding mode candidate will now be explained.

In the first selection method, a total number of candidates which are selected in response to a step width of quantizing may be varied.

Figure 4A:
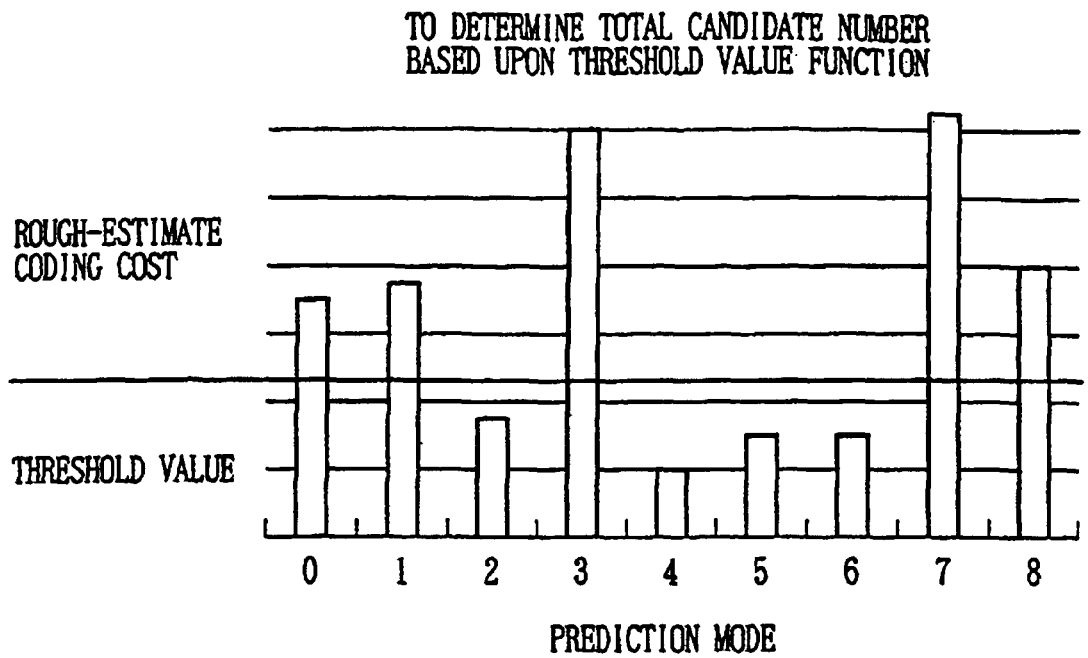
FIGS. 4A and 4B are diagrams for graphically representing examples of prediction mode selecting methods according to the first embodiment.
Figure 4B:
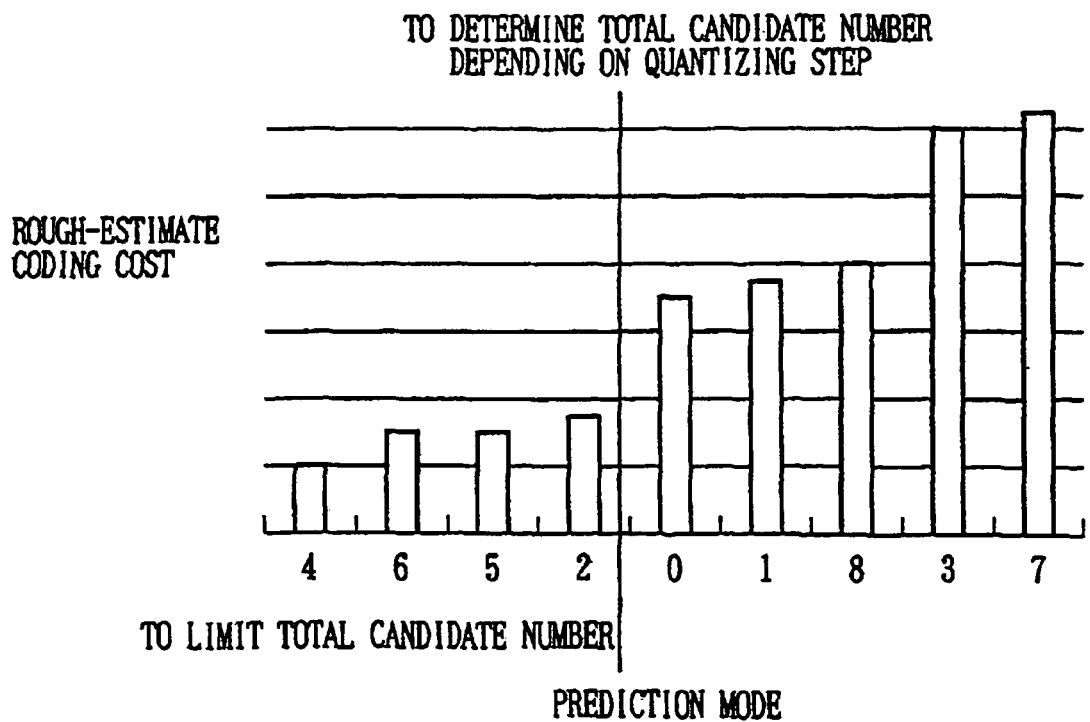

As an example, a first selection method example of this first embodiment is shown at FIG. 4B. While rough-estimate coding costs are arrayed in an increment order, only a predetermined number of candidates of the coding costs are selected as from a first or least one.

Correlations of rough-estimate coding costs and Lagrange costs with respect to quantizing step widths vary with coding modes. Thus, if such a candidate, which should be selected, based upon the Lagrange cost is remained or selected in the candidates which have been selected based upon the rough-estimate coding cost, then a coding efficiency is not lowered. Thus, a total number of candidates may be adjusted in response to a quantizing step width. Hence, reduced are calculation amounts required for performing coding operations, quantizing operations, orthogonal transforming operations, and the like as to candidates which are not selected.

In a mode judging operation using a Lagrange cost, a Lagrange multiplier is adjusted in such a manner that this Lagrange multiplier may behave in an exponential function manner which depends upon a quantizing step. In general, when a value of a quantizing step is small, there is a tendency that time required for coding a residual is increased, and thus, an entire calculation amount is increased. When a value of a quantizing step is large, since a coding amount of a residual by coding operation is decreased, time is reduced which is consumed in the coding operation.

Since a total number of the candidates is selected in response to the quantizing step width, the above-described correlation between the Lagrange cost and the rough-estimate coding cost should be investigated on beforehand. In the case that the correlations are not changed in all of the quantizing step widths, a total number of the candidates may be selected to be a fixed number. For example, in the case of such a coding system as H. 264, there is such a trend that a cost-wise correlation between a rough-estimate coding cost and a Lagrange cost of an in-frame coding operation becomes small when a quantizing step is small; whereas this cost-wise correlation becomes large when a quantizing step is large. On the other hand, as to an inter-frame coding operation, a cost-wise correlation between a rough-estimate coding cost and a Lagrange cost does not considerably depend upon a quantizing step. As a result, a total number of candidates may be set to be a fixed number. An example for determining a total number of candidates on beforehand is represented in FIG. 19A and FIG. 19B.

An ordinate of FIG. 19A and FIG. 19B shows an example of a "candidate right answering rate" or candidate correct-response ratio, which represents a ratio that first two ones selected from rough-estimate coding costs are also selected by Lagrange cost evaluations. A candidate right answering rate of 100% means that a coding mode selected based upon a rough-estimate coding cost is completely made coincident with a coding mode selected based upon a Lagrange cost, and coding results are made coincident with each other by 100%. A candidate right answering rate for indicating as to whether or not a coding mode selected based upon a rough-estimate coding cost is made coincident with a coding mode selected based upon an elaborate-estimate coding cost is not considerably influenced by either an image or an image size, but may strongly depend upon a value of a quantizing step width. Hence, more robust coding with respect to the images is realized by finding on beforehand dependency of each coding mode upon the step of quantizing.

In FIG. 19A, the right answering rate is monotone-wise increased with increase of the step width of quantizing. In this way, with no decrease of a coding efficiency, a calculation amount is reduced by such a manner that: a total number of candidates is increased in an area where a quantizing step is small; and a total number of candidates is decreased in an area where a quantizing step is large.

In FIG. 19B, a high coding efficiency is retained by such a manner that: a total number of candidates is decreased in an area where a quantizing step is small; and a total number of candidates is increased in an area where a quantizing step is large.

As previously explained, in the respective mode judging operations, the correlation between the rough-estimate coding cost and the Lagrange cost in response to the quantizing step is found out on beforehand. The right answering rate for indicating as to whether or not the mode selected based upon the rough-estimate coding cost is made coincident with the mode selected based upon the elaborate-estimate coding cost is found out; and the candidate selecting number is varied with range or spectrum of the quantizing step. In this way, the high speed coding operations can be realized in all of the bit rate bands under stable condition without lowering of the coding efficiency.

(4-2) Second Selecting Method

A description is made of a second selecting method for selecting a coding mode candidate.

In the second selecting mode, a total number of coding mode candidates which are selected is varied in a monotone manner in response to a quantizing step.

For instance, in the case of the coding system such as H. 264, there is such a trend that a cost-wise correlation of an in-frame coding operation becomes small when a quantizing step is small, and a cost-wise correlation of the in-frame coding operation becomes large when a quantizing step becomes large.

In other words, since a total number of candidates is increased in a high bit rate and a total number of candidates is decreased in a low bit rate, a coding operation is carried out without lowering a coding efficiency. On the other hand, in mode-judging operations in a level at which various coding modes are mixed with each other, there is such a coding mode which is easily selected in response to a value of a quantizing step.

For example, in an inter-frame coding operation of H. 264, a 4×4 block size prediction tends markedly to be carried out at ranges where the quantizing step is small, because the blocks are small and precise prediction operation is achievable.

However, since the code amount of the coding mode itself is large, the coding mode is hardly selected in a range where the quantizing step is large. In other words, if the 4×4 prediction is selected in such a range that the quantizing step is small, then a coding efficiency is not lowered. On the other hand, in a 16×16 block size prediction corresponding to a large pixel block size prediction, since the block size is large and a total number of prediction modes which can be selected is also small, prediction precision is not so high, as compared with that of the 4×4 block precision. However, since a code amount of a coding mode itself is small, when the quantizing step is increased, such coding mode tends to be selected. As a consequence, in such a range that the quantizing step becomes large, the 4×4 block size prediction is mixed with the 16×16 block size prediction in a proper degree, so that a mode judging becomes difficult. In a mode judging operation when the various coding modes are mixed with each other, a total number of the candidates is set as increased in the monotone manner with the increase of the quantizing step, so that candidates adoptable by the coding mode are increased so as to maintain the coding efficiency.

(5) Modified Example of First Embodiment

A modified example of the first embodiment will now be described.

In this modified example, only a prediction mode is selected, the rough-estimate coding cost of which is smaller than a threshold value function. This threshold value depends upon a quantizing step. Thus, similar to the above-described first embodiment, a calculation amount is reduced and a coding operation is kept as stable in all of quantizing step value ranges.

An outline of this prediction mode selection is represented in FIG. 4A. When a magnitude of a cost that has been calculated with respect to a plurality of prediction modes is larger than a certain threshold, it is so judged that probability at which selected prediction modes constitute the optimum candidates is low. Thus, it is projected deterioration of the imaging quality or increase of the coding amount due to large amount of the prediction residual. This threshold value takes a value that varies with the quantizing step, and becomes, for example, a decreasing function with respect to a quantizing step QP. For example, the following formula 4 is presented:

$$\theta_{th} = a \exp(-bQP) \quad \text{[Formula 3]}$$

In this formula 4, symbol "$\theta_{th}$" shows the above-described threshold value. When the quantizing step QP is small, the Lagrange multiplier "$\lambda$" becomes small and a coding mode whose coding distortion is small tends to be selected. Thus, a probability that a prediction mode having a small prediction residual is selected as an optimum mode is high, the threshold value "$\theta_{th}$" is increased so as to decrease a total number of candidates. As a result, a calculation amount is largely reduced. Conversely, when the quantizing step QP is large, a large number of prediction modes have to be selected and employed and an optimum coding mode has to be selected from the plural candidates so that a total candidate number of the prediction modes is adjusted in such a manner that an image quality deterioration is lowered. Meanwhile, when the quantizing step QP becomes large, a code amount is decreased by a quantizing operation, and a required calculation amount is decreased. As a result, even when a large number of coding modes are selected, an increase of the calculation amount is small. By adjusting in this way the total candidate number of the prediction modes which are selected by the quantizing step QP, the calculation amount which is expended in the prediction mode judging operation is largely reduced, while maintaining the image quality. Thus, the stable coding operation may be carried out in all of the quantizing step ranges.

(5-1) Coding Process Operation

Figure 15:
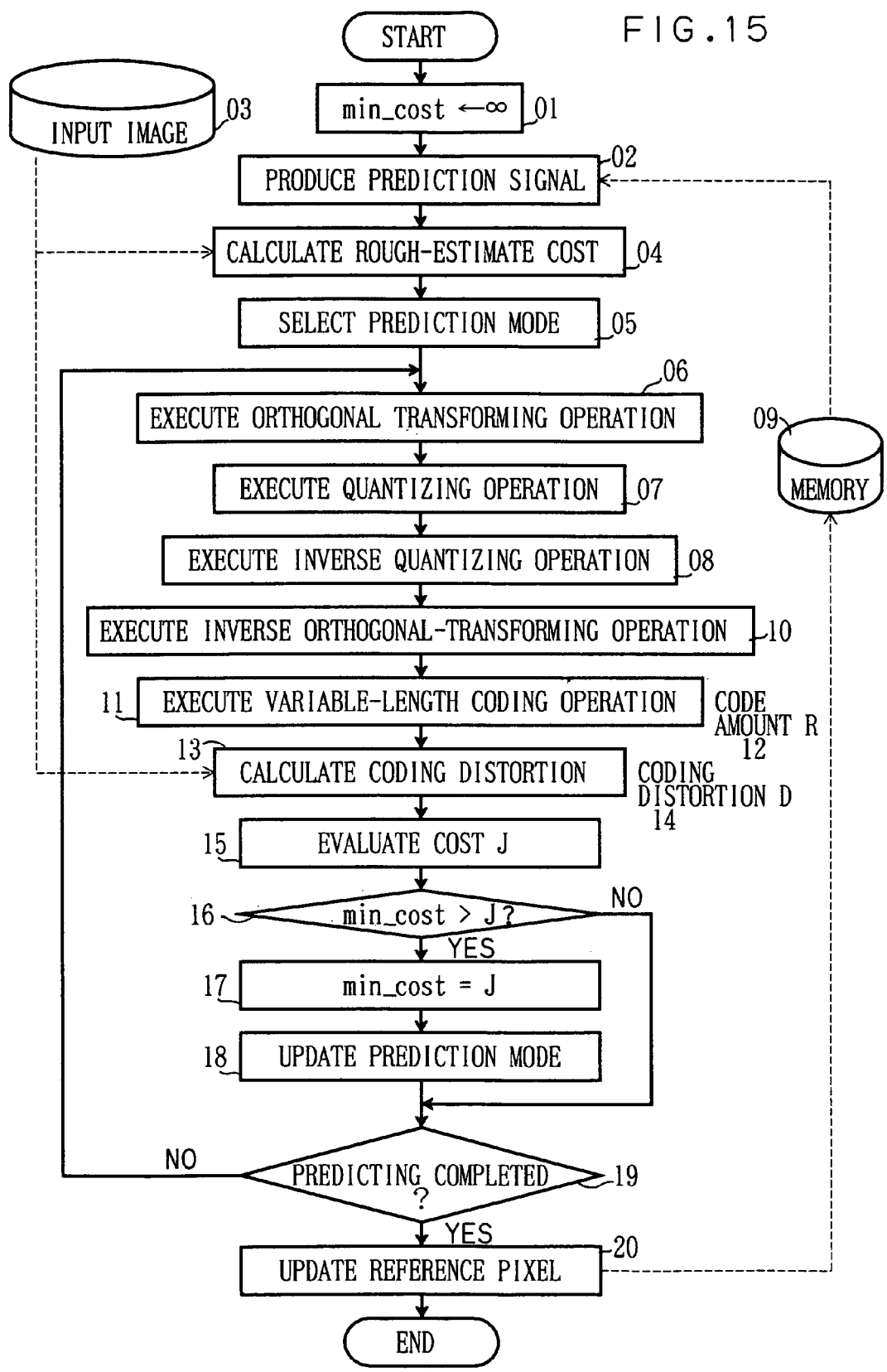
FIG. 15 is a flow chart for describing an example of a high speed coding process operation with employment of a rough-estimate coding cost according to the modified example of the first embodiment.

FIG. 15 shows a flow chart for describing a process of a coding in accordance with this first embodiment.

In the flow chart shown in FIG. 15, first of all, a variable "min_cost" for updating a minimum cost is initialized (step 01). A prediction signal production (step 02) is carried out by a coding control operation; a rough-estimate coding cost calculation is performed by employing a calculated prediction value and an input image inputted at step 03, as well as a code amount of this coding mode (step 04). A first prediction mode selection (step 05) is carried out based upon the calculated rough-estimate coding cost in accordance with the first embodiment, a second embodiment, and a third embodiment. With respect to the mode selected in this first prediction mode selection, the following process operations are sequentially carried out in a prediction mode loop: an orthogonal transforming operation (step 06); a quantizing operation (step 07); an inverse quantizing operation (step 08); an inverse orthogonal transforming operation (step 10); a variable-length coding operation (step 11); and a coding-distortion calculation (step 13).

Thereafter, a Lagrange cost evaluation is carried out based upon a code amount R12 obtained by the variable coding operation as well as a coding distortion D14 obtained in the coding distortion calculation (step 15); and then, a judgement is made as to whether or not a "min_cost>J" of the above-described prediction mode (step 16). When this judgement result is YES, the minimum cost is updated (step 17) and the prediction mode is updated (step 18). As a result, optimum coding modes in the second selection step are restrictedly selected to be one optimum code mode.

After the prediction mode has been updated, and when the judgement result as to "min_cost>J" becomes NO, the prediction completement is determined (step 19). When the prediction mode loop defined from the step 05 to the step 18 is repeatedly carried out plural times equal to a total number of prediction modes which are selected by the mode selecting operations, the prediction loop is completed. Thereafter, a reference pixel is updated (step 20), and then, the process operation is ended.

Thereafter, the decoded image signal obtained in the above-described prediction mode is stored into the memory as a reference pixel signals, and this reference pixel signal will be utilized so as to predict a next macroblock.

Figure 5:
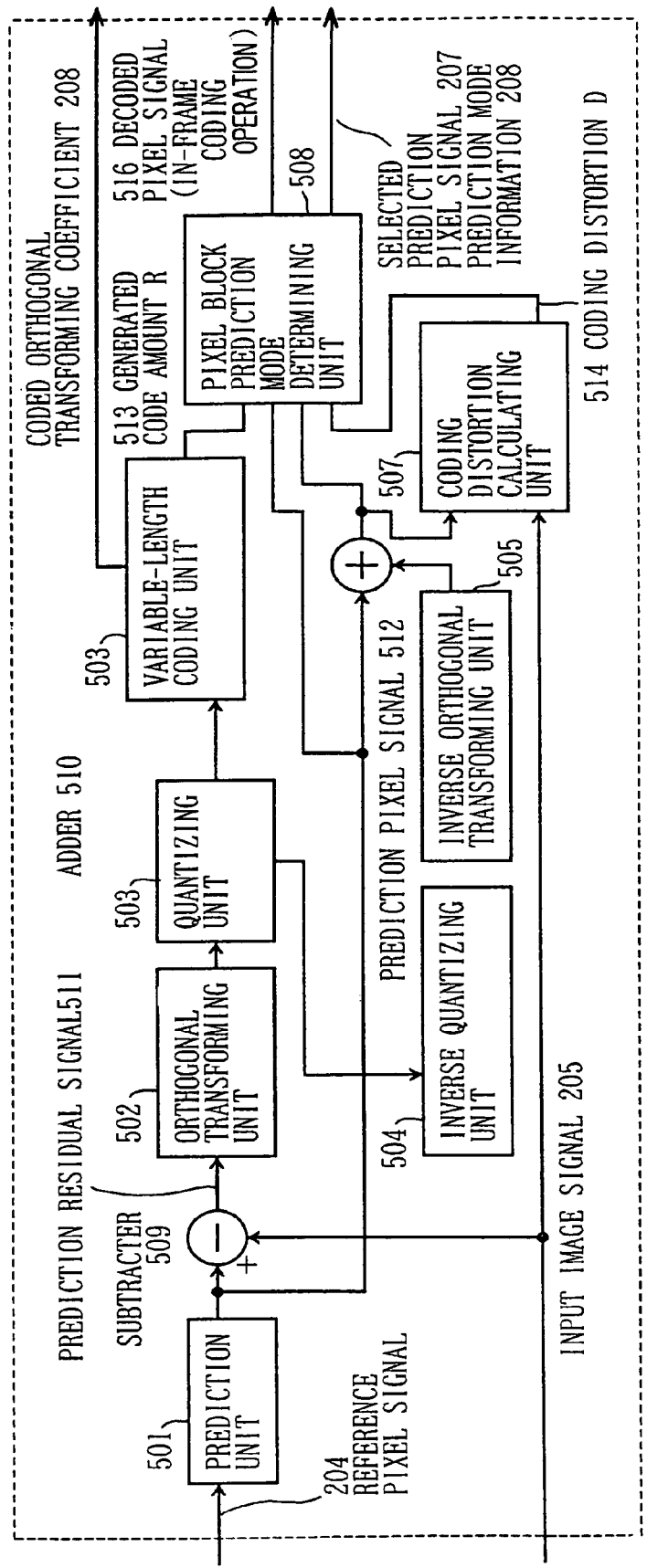
FIG. 5 is a block diagram for schematically showing an example for performing a rate-distortion-wise optimizing mode judgement according to a modified example of the first embodiment.

(5-2) Process Operation for Calculating Lagrange Cost so as to Execute Mode Judging Operation On the other hand, a mode judging system is represented in FIG. 5, in which both a generated code amount and a coding distortion are actually measured; and then, a Lagrange cost is calculated based upon the actually measured amounts so as to perform a mode judging operation. Process steps at this time are indicated in a flow chart of FIG. 16.

(5-2-1) Arrangements of In-Frame Coding Unit 202 and Inter-Frame Coding Unit 203

FIG. 5 shows an internal arrangement of the in-frame coding unit 202 (and inter-frame coding unit 203) indicated in FIG. 2.

In this internal arrangement, when the reference pixel signal 204 is entered to a predicting unit 501, the predicting unit 501 outputs a predicted pixel signal 512. The predicted pixel signal 512 is subtracted from the input image signal 205 by a subtracter 509, so that a residual signal 511 is produced. This residual signal 511 is orthogonally transformed by an orthogonal transforming unit 502 (for instance, DCT etc.). The orthogonally transformed coefficient obtained by the orthogonal transforming operation is quantized by a quantizing unit 503. The quantized orthogonally-transformed coefficient is sent to a variable length coding unit 506 so as to be variable-length-coded, so that a generated code amount R(513) is obtained.

The quantized orthogonally-transformed coefficient is then inverse-quantized by an inverse quantizing unit 504, and is further decoded by an inverse orthogonal transforming unit 505, so that a local decoded signal is produced. This local decoded signal is added to the predicted pixel signal 512 obtained from the predicting unit 501. The addition result is inputted as a decoded pixel signal 516 to a coding distortion calculating unit 507. The coding distortion calculating unit 507 calculates a coding distortion D(514) based upon the inputted image signal 205 and the decoded pixel signal 516. Both the decoded distortion D(514) and the generated code amount R(513) are inputted to a prediction mode determining unit 508.

The prediction mode determining unit 508 calculates a Lagrange cost from both the coding distortion D(514) and the generated code amount R(513) by employing the Lagrange undetermined multiplying method; and then, while a prediction mode of a minimum cost is defined as a final prediction mode, this prediction mode determining unit 508 outputs a decoded pixel signal 516 and an orthogonal transformation coefficient 207.

(5-2-2) Processing Method

Figure 16:
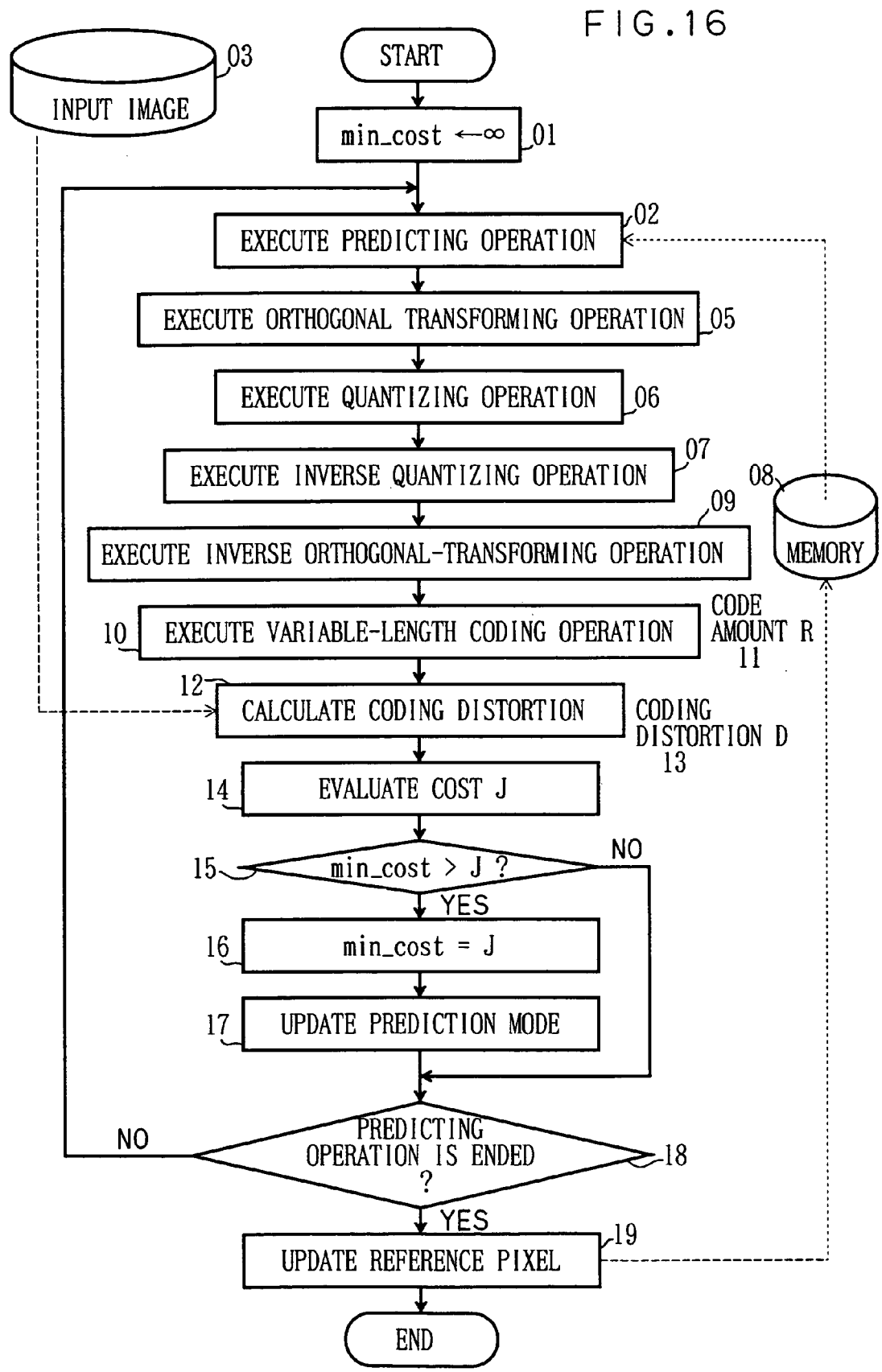
FIG. 16 is a flow chart for explaining an example of coding process operation with employment of a rate-distortion-wise optimization according to the modified example of the first embodiment.

In accordance with a flow chart shown in FIG. 16, a variable "min_cost" for updating a minimum cost is initialized (step 01). A prediction operation (step 02) is carried out; and then, in a prediction mode loop, the following process operations are sequentially carried out: an orthogonal transforming operation (step 05); a quantizing operation (step 06); an inverse quantizing operation (step 07); an inverse orthogonal transforming operation (step 09); a variable length coding operation (step 10); and a coding distortion calculation (step 12). In this case, when the prediction modes are increased, the calculation amounts are accordingly increased. However, both the code amount R11 and the coding distortion D13 are correctly calculated, so that a coded image having a high image quality is obtained, the coding efficiency of which is high.

Thereafter, a cost evaluation is carried out based upon the coding distortion D (step 14), and a judgement as to "min_cost>J" is made (step 15). When the judgement result becomes YES, the minimum cost is updated (step 16), and the prediction mode is updated (step 17).

After the prediction mode has been updated, and when the judgement result as to "min_cost>J" becomes NO, the prediction completement is determined (step 18). The prediction mode loop from the step 02 down to the step 18 is repeatedly carried out plural times equal to a total number of prediction modes so that the prediction loop is completed. Thereafter, a reference pixel is updated (step 19), and then, the process operation is ended.

In a rate-distortion optimizing mode judging operation, all of the coding modes are coded, Lagrange costs are measured by calculating coding distortions and code amounts, and then, such a coding mode for giving a minimum cost is judged as an optimum coding mode. In the flow chart of FIG. 16, since the prediction mode loop contains the process steps defined from the prediction step 02 to the prediction completement judging step 18, the following fact is revealed. Until all of the prediction operations are completed, the orthogonal transforming operation, the quantizing operation, the inverse quantizing operation, the inverse orthogonal transforming operation, the coding operation, and the like are repeatedly carried out, so that a huge amount of calculating operations is required.

Second Embodiment

Next, a description is made of process operations in the case that an in-frame coding method is selected by the prediction control unit 201, according to a second embodiment of the present invention.

The second embodiment is featured as follows: At first stage, executed on first hand is a prediction mode having a prediction direction that is calculated from a plurality of pre-coded adjoining blocks. At next stage, rough-estimate coding costs are calculated by use of prediction modes that has been selected out, as to become less dense, from a plurality of possible prediction directions. Thus, a predominant direction is determined which corresponds to such a prediction direction whose rough-estimate coding cost becomes minimum. Then, rough-estimate coding costs are calculated with respect to prediction directions in vicinity of a direction that is judged to be the predominant direction; namely, with respect to prediction modes having inclinations or gradients of directions in vicinity of the selected predominant direction. Then, such a prediction mode whose rough-estimate coding cost becomes minimum is selected from all of these selected prediction directions. In this way, a calculation amount for producing a predicted image is decreased.

For instance, in luminance signals in in-frame prediction such as H. 264, two manners of dividing have been proposed: (1) 1 macroblock has 16 pieces of 4×4 pixel blocks; and (2) 1 macroblock has 1 piece of 16×16 pixel block. Nine prediction modes are present in the 4×4 pixel blocks, whereas 4 prediction modes are present in the 16×16 pixel block.

Figure 6:
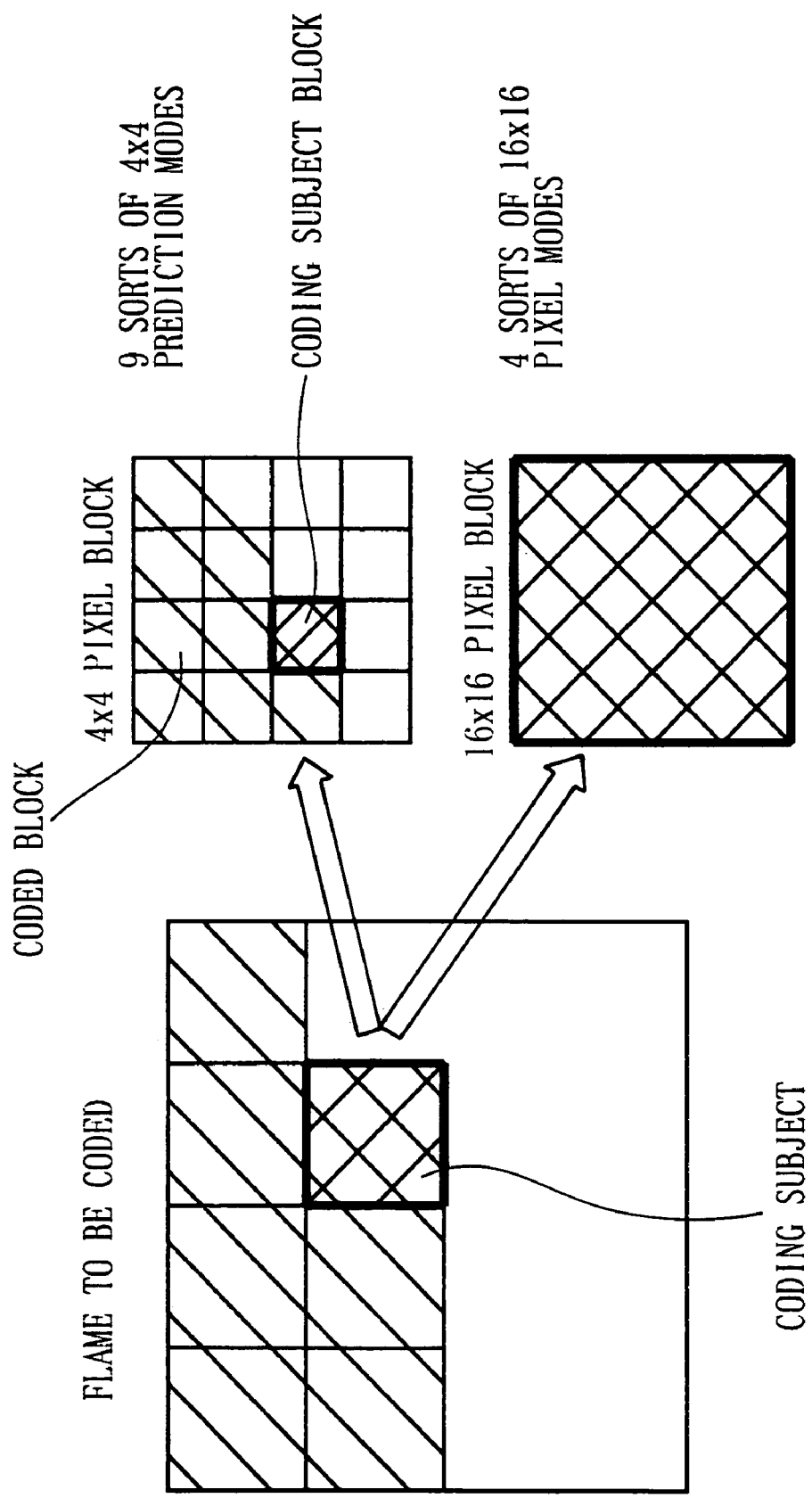
FIG. 6 is a diagram for representing a dividing example of a pixel block and a prediction mode, according to a second embodiment of the present invention.

FIG. 6 shows a block shape of macroblocks employed in an in-frame prediction of H. 264. In H. 264, or the like, a frame which should be coded is divided into a macroblock consisting of 16×16 pixels; and furthermore, the macroblock is subdivided into blocks having 4×4 pixels in the in-frame prediction. In the case of the 4×4 pixel blocks, a 4×4 prediction is sequentially carried out 16 times in the above-described in-frame prediction.

FIGS. 7A-7I represent all of prediction modes in 4×4 pixel blocks of an in-frame prediction of H. 264, namely, a vertical (downward) prediction mode; a horizontal (rightward) prediction mode; a DC prediction mode; an orthogonal lower-leftward prediction mode; an orthogonal lower-rightward prediction mode; a rightward-slanted vertical prediction mode; a downward-slanted horizontal prediction mode; a leftward-slanted vertical prediction mode; and an upward-slanted horizontal prediction. Symbols "A" to "M" show reference pixel signals which have already been coded.

Figure 11:
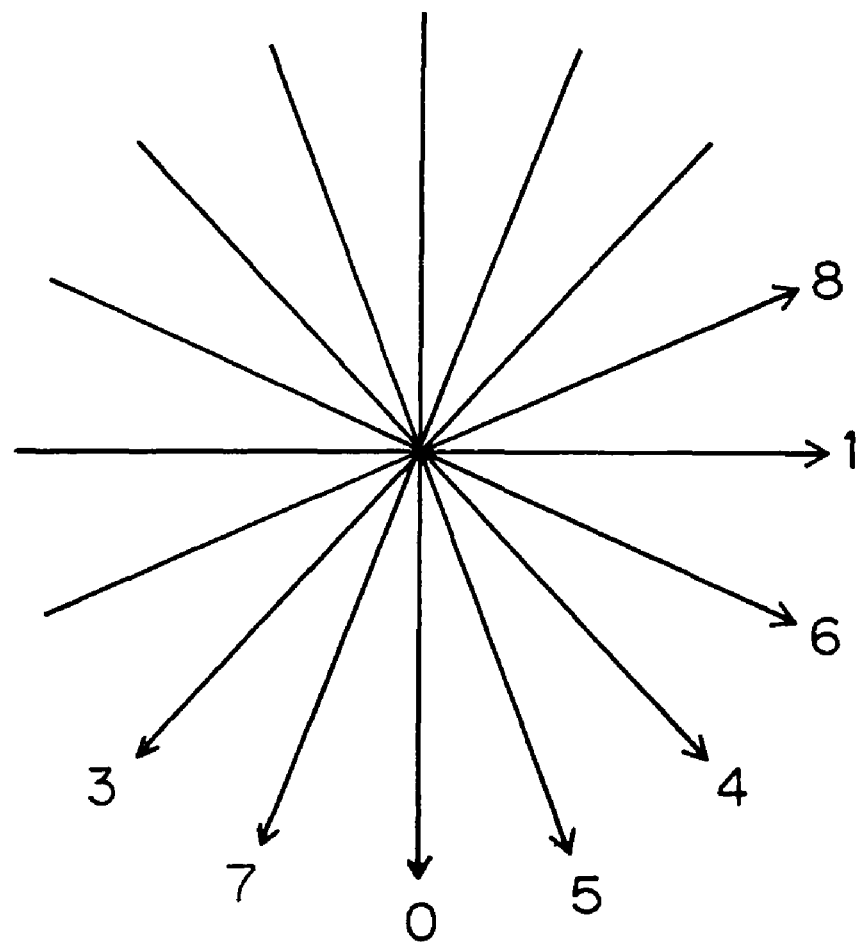
FIG. 11 is a diagram for illustratively showing an example of a prediction direction of a 4×4 prediction of H. 264, according to the second embodiment.

For instance, in the vertical prediction mode, all pixels of 4×4 blocks are predicted from the reference pixels A, B, C, D which have already been coded, along the vertical directions. In the DC prediction mode, an average values are calculated based upon the reference pixels A to D and J to M, and then, all pixels of 4×4 blocks are predicted based upon the calculated average value. FIG. 11 shows prediction numbers which correspond to these prediction directions.

FIGS. 8A-8D indicate all of prediction modes in 16×16 pixel blocks of H. 264, namely, a vertical prediction mode; a horizontal prediction mode; a DC prediction mode; and a plane-wise or two-dimensional prediction mode. Symbols "H" and "V" represent a horizontal reference pixel signal and a vertical reference pixel signal respectively, which have already been coded.

(1) Process Operation of Coding Control Unit 111

A process operation executed when an in-frame coding method is selected by the coding control unit 111 will now be explained with reference to FIG. 9, while the 4×4 prediction in the in-frame coding system of H. 264 is exemplified.

When the in-frame prediction (4×4 prediction) is selected under control of the coding control unit 111, the reference pixel signal 204 which has been stored in the frame memory 107 is entered to a prediction mode hierarchical processing unit 901. This prediction mode hierarchical processing unit 901 constitutes a closed loop within a first mode judging unit 904, and selects a prediction mode of the 4×4 prediction based upon a prediction pixel signal 911 produced by a 4×4 predicting unit 903. The prediction pixel signal 911 outputted from the prediction mode hierarchical processing unit 901 is subtracted from the input pixel signal 205 by a subtracter 909 to become a prediction residual signal 910, and then, this prediction residual signal 910 is entered to a 4×4 candidate selecting unit 902. Alternatively, in this case, the prediction residual signal 910 may be Hadamard-transformed by an HT unit 923 so as to form a transformed residual signal.

The 4×4 candidate selecting unit 902 selects a proper prediction mode based upon either the prediction residual signal or the transformed residual signal. While the prediction mode selected by the prediction mode hierarchical processing unit 901 is controlled by the 4×4 candidate selecting unit 902, the above-explained rough-estimate coding cost is calculated in response to the present prediction condition, and a next prediction mode is controlled.

While a prediction pixel signal 911 produced by a 4×4 predicting unit 903 is connected to the 4×4 candidate selecting unit 902, either one prediction mode or plural prediction modes are selected to be supplied to a second mode judging unit.

An internal arrangement of the second mode judging unit is completely identical to that explained with reference to FIG. 3. It should also be understood that since this second mode judging unit may merely perform a process operation only as to the optimum prediction mode (one candidate) selected by the first mode judging unit 904. Because coding has to be made only with respect to one mode, the processing by this first mode judging unit 904 is in a considerably higher speed, as compared with the conventional Lagrange undetermined multiplying method.

Figure 9:
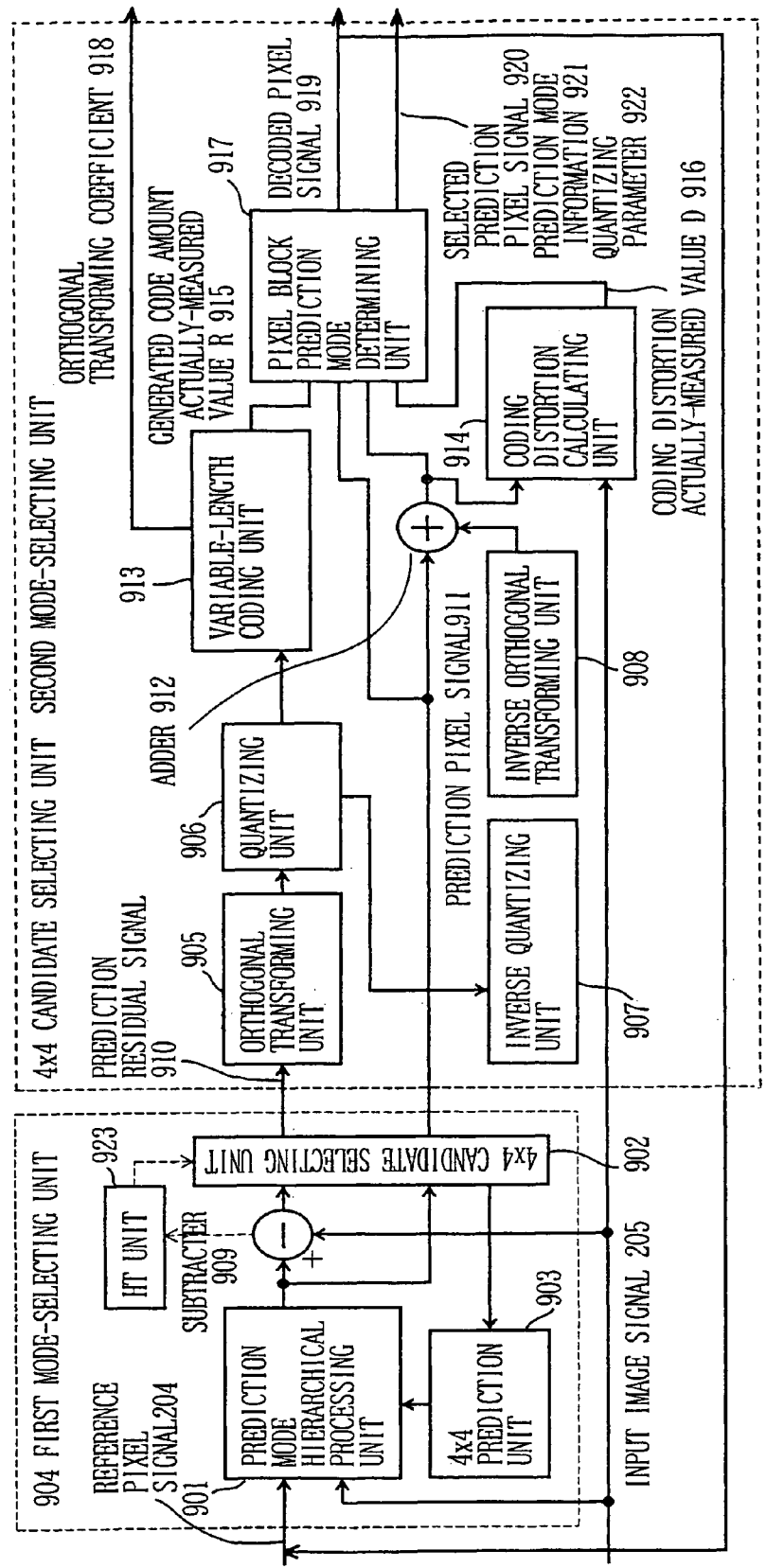
FIG. 9 is a schematic block diagram for indicating an example related to high speed operation of in-frame coding 4×4 prediction of H. 264, according to the second embodiment.

In another embodiment, a plurality of prediction modes obtained from a first mode judging unit 904 of FIG. 9 may be alternatively connected to the first mode judging unit of FIG. 3 so as to be further processed in a hierarchical manner.

In the first mode judging unit 904, a hierarchical process operation is carried out by employing the 4×4 prediction feature. As previously explained, in the 4×4 prediction of H.264, 8 prediction modes have been prepared in response to the prediction directions except for the DC prediction mode, and thus, the prediction operations may be carried out in an interval of 22.5 degrees.

(2) Processing Method

Figure 17:
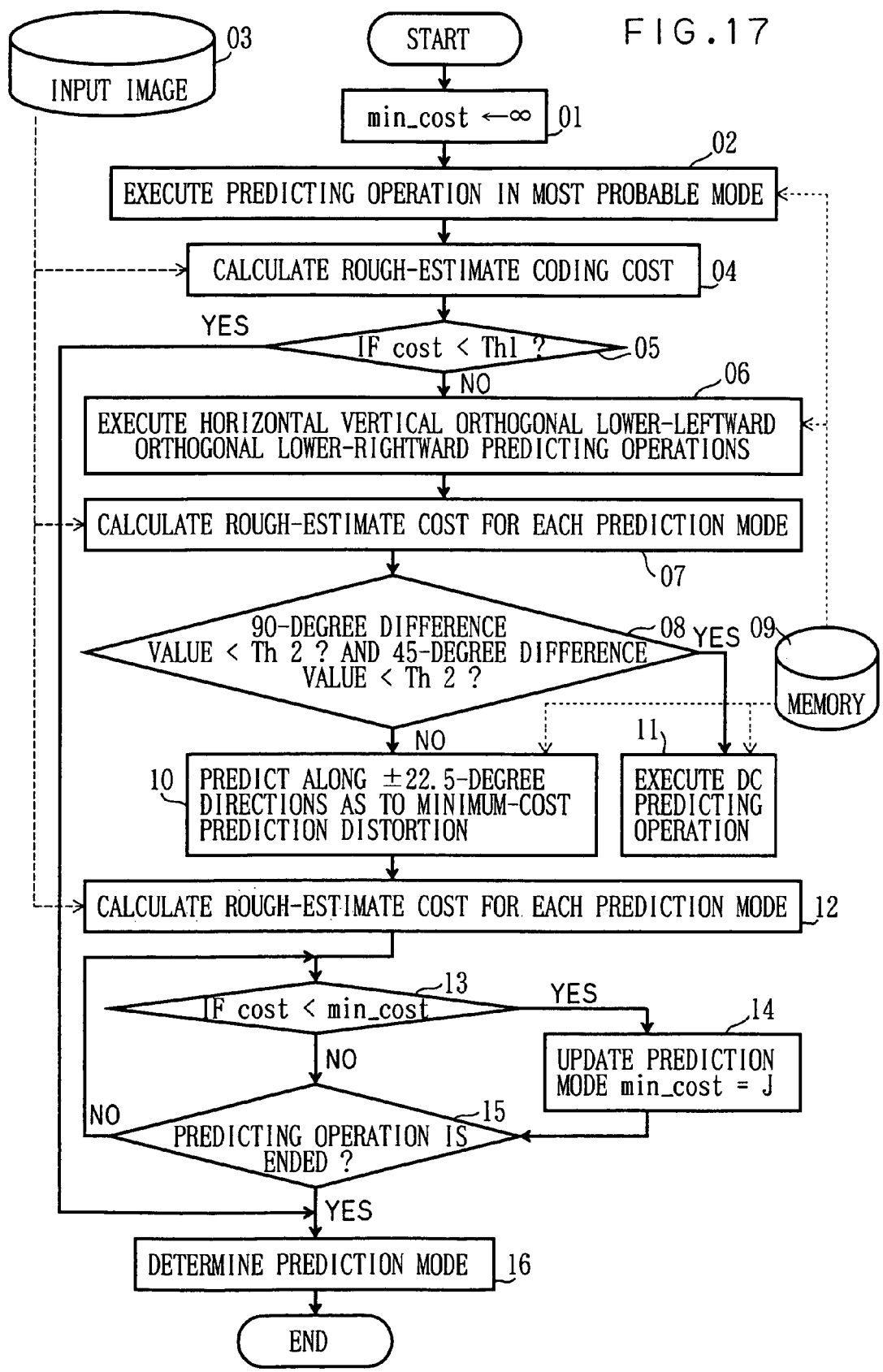
FIG. 17 is a flow chart for describing an example as to an in-frame high speed coding operation with employment of a hierarchical search according to the second embodiment.

In accordance with a flow chart shown in FIG. 17, a variable "min_cost" used to update a minimum cost is firstly initialized (step 01). As a mode having a code amount for coding the coding mode information, a predicting operation is carried out for a mode which is calculated from a prediction mode selected in adjoining blocks (step 02). A rough-estimate coding cost is calculated by employing both the produced prediction pixel signal and an input image 03 (step 04). A judegment as to whether "cost<Th1" stands or not carried out (step 05). If the judgement result becomes YES, namely, if the rough-estimate coding cost is smaller than the threshold value "Th1", then the above-described prediction mode is determined as an optimum prediction mode (step 16), and the hierarchical process operation is completed.

To the contrary, if the judgement result becomes NO, then prediction operations corresponding to "0", "1", "3", "4" of FIG. 11 are performed (step 06). In other words, predictions along directions of 90 degree, 0 degree, 225 degree, and 45 degree with respect to the center of FIG. 11 are made as to correspond respectively with vertical prediction, the horizontal prediction, the orthogonal lower-leftward prediction, and the orthogonal lower-rightward prediction. Rough-estimate coding costs corresponding to the respective predictions are calculated out by use of thus produced prediction pixel signal and the input image (step 07). A difference value in respect of 90 degree of direction difference is calculated which corresponds to an absolute difference value between a horizontal prediction cost and a vertical prediction cost is calculated; and a difference value in respect of 45 degree of direction difference is calculated which corresponds to an absolute difference value between an orthogonal lower-leftward prediction cost and an orthogonal lower-rightward prediction cost; and thus, a judging operation is carried out (step 08). In the case that both the difference values are smaller than a threshold value "Th2", since it is so judged that a directional correlation is small, a DC prediction is carried out (step 11). When the judgement result becomes NO, a coding cost along a certain direction becomes minimum and a predominant prediction is present. As a result, such a prediction having the smallest cost among these four costs is determined; and then, predicting operations along a direction of +22.5 degrees and another direction of −22.5 degrees with respect to thus determined direction are carried out as along prediction directions in vicinity of the determined direction (step 10). In other words, in the case that a predominant direction is the prediction direction "4" shown in FIG. 6, predictions along directions "5" and "6" are made which are respectively at angles of +22.5 degree and −22.5 degree with respect to the prediction direction "4". A rough-estimate coding cost corresponding to each of these prediction modes is calculated by use of the above-described prediction pixel signal and the input image (step 12). A judgement as to whether "cost<min_cost?" is carried out within all of the prediction modes which have been produced up to this step (step 13). In such a case that the judgement result becomes YES, both "min_cost" and the prediction mode are updated (step 14). If the judgement result becomes NO, "min_cost" and the prediction mode are not updated, and a next prediction mode is checked. A prediction end judgement is carried out (step 15). If the judgement result becomes YES, an optimum prediction mode is determined (step 16); and then, the process operation is ended. Within the prediction modes which have been selected in this manner, such a prediction mode having the smallest cost is searched.

When the processing operation is roughly divided in response to the prediction directions, this processing operation is constituted by the three prediction steps of "step 02", "step 06", and "step 10". As a result, a total number of predicting processing becomes 1 in the best case, whereas a total number of the predicting processing becomes 7 in the worst case. The threshold value "Th1" takes a value which is varied with a quantizing step, and is required to be adjusted in such a manner that the code amount of the 4×4 prediction, the code amount of the 16×16 prediction, and the trade off of the residual are improved or remedied. In other words, since the 16×16 prediction may be easily selected in the area whose quantizing value is small, as compared with the 4×4 prediction, if the threshold value Th1 takes the large value, then the 4×4 prediction is executed in a high speed. On the other hand, in a range quantizing value is large, the 4×4 prediction is predominant; thus, it is required to take the threshold value "Th1" approximated to zero, as to improve the precision.

(3) Modified Example of Second Embodiment

In this modified example, a series of steps for executing the prediction mode read out from the adjoining blocks—the "step 02", "step 04", and "step 05"—may be omitted from the flow chart of FIG. 17.

Third Embodiment

Next, a description is made of a third embodiment of the present invention as to a mode selecting operation of a 16×16 prediction.

In this third embodiment, a mode judging operation for a 4×4 pixel block or a small pixel block is executed in advance, so that mode information of the small pixel block is utilized in judging of a large pixel block.

(1) Arrangement of First Mode Judging Unit 1006

Figure 10:
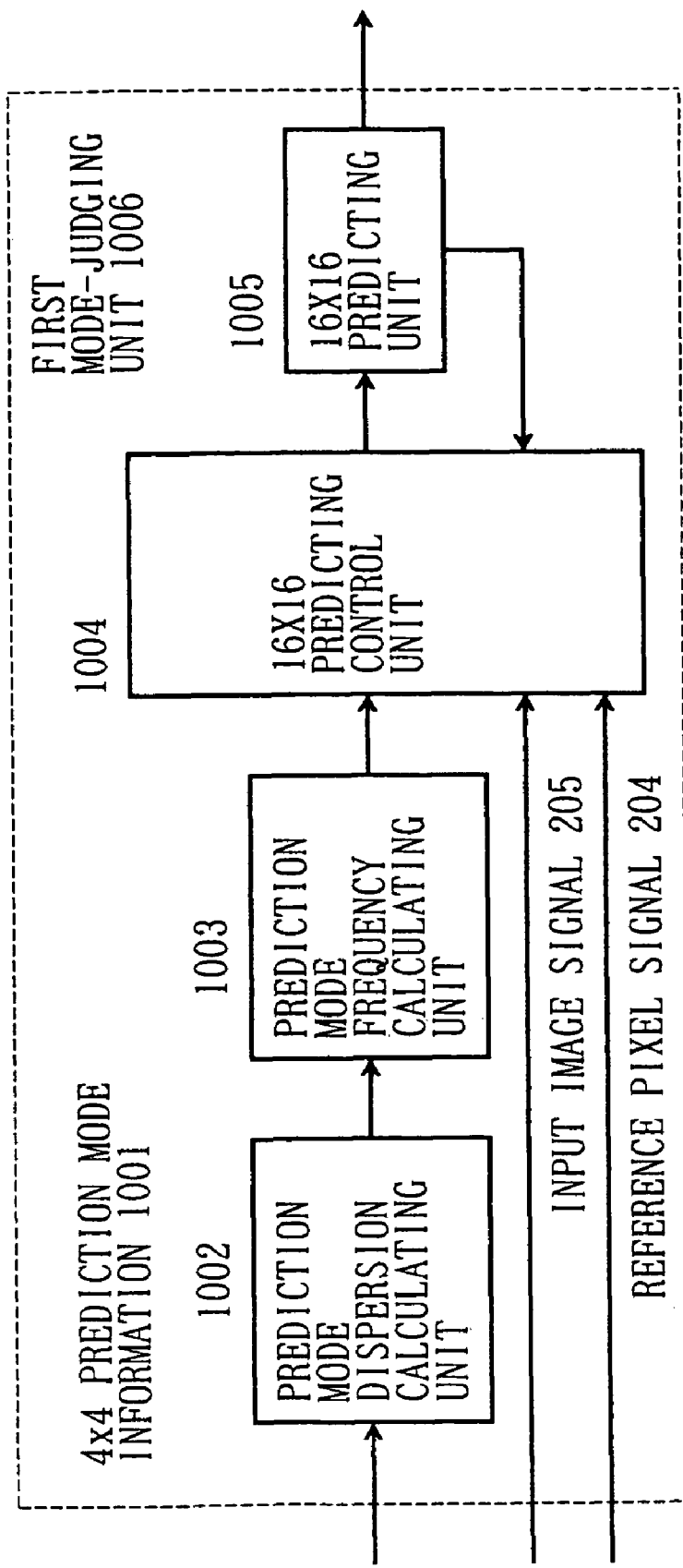
FIG. 10 is a schematic block diagram for indicating an example related to a high speed operation of an in-frame coding 16×16 prediction of H. 264, according to a third embodiment of the present invention.

FIG. 10 shows an arrangement of a first mode judging unit 1006 when a 16×16 prediction is selected. An arrangement of a second mode judging unit in this embodiment is same with that of FIG. 3; therefore, only the first mode judging unit 1006 is represented in the FIG. 10.

In the 16×16 prediction, in order to execute a process operation in a high speed, 4×4 prediction mode information 1001 is employed which is determined by the 4×4 prediction. A prediction mode dispersion calculating unit 1002 calculates dispersion of the above-described 4×4 prediction mode information 1001. Furthermore, a prediction mode frequency calculating unit 1003 calculates a weighted frequency of 16 mode indexes. A 16×16 prediction control unit 1004 selects a mode which will be predicted by use of the dispersion and the weighted frequency; and a 16×16 predicting unit 1005 produces a 16×16 prediction pixel signal.

When the dispersion "$\sigma^2$" of the 4×4 prediction mode information is small, since the prediction modes are matched with each other in each of the 4×4 pixel blocks, it is desirable to select such a 16×16 prediction resembilng the 4×4 prediction. To the contrary, when the dispersion "$\sigma^2$" is large, since the prediction modes have different directions from each other, there is a high possibility that either the plane prediction or the DC prediction will succeed. Assuming now that a weighted frequency along a vertical direction is equal to "$H_{hist}$" and a weighted frequency along a horizontal direction is equal to "$V_{hist}$", each of these frequencies is calculated by formulae 5 and 6 at below:

$$H_{hist} = \sum_{s}^{s=9} \varphi(M_s), V_{hist} = \sum_{s}^{s=9} \phi(M_s) \quad [\text{Formula 5}]$$

$$\varphi(M_s) = \begin{cases} a & \text{if } (M_s = 1) \\ b & \text{if } (M_s = 6 \text{ or } M_s = 8) \\ c & \text{if } (M_s = 3 \text{ or } M_s = 4) \\ 0 & \text{others} \end{cases} \quad [\text{Formula 6}]$$

$$\phi(M_s) = \begin{cases} a & \text{if } (M_s = 0) \\ b & \text{if } (M_s = 5 \text{ or } M_s = 7) \\ c & \text{if } (M_s = 3 \text{ or } M_s = 4) \\ 0 & \text{others} \end{cases}$$

In these formulae, symbol "$M_s$" shows 4×4 prediction mode information, and symbol "s" represents an index of a 4×4 pixel block. Symbols "a", "b", "c" represent constants. When the weighted frequency "$H_{hist}$" of the vertical direction is larger than a threshold value "$\theta_M$", it is understood that a correlation along the vertical direction is strong. As a result, a vertical prediction of the 16×16 prediction is selected, both a prediction image producing cost and a prediction image coding cost are calculated. In this case, if the dispersion is larger than a threshold value "$\theta_{\sigma^2}$", a plane-wise or two-dimensional prediction is also selected at the same time; and both a prediction image producing cost and a prediction image coding cost are calculated (it should be noted that the "$\theta_{\sigma^2}$" represents a state a suffix "$\sigma^2$" is attached to "$\theta$"). Similarly, when the weighted frequency "$V_{hist}$" of the horizontal direction is larger than the threshold value "$\theta_M$", it is understood that a correlation along the horizontal direction is strong. As a result, a horizontal prediction of the 16×16 prediction is selected, both a prediction image producing cost and a prediction image coding cost are calculated. Also in this case, if the dispersion is larger than the threshold value "$\theta_{\sigma^2}$", a plane-wise or two-dimensional prediction is selected, and both a prediction image producing cost and a prediction image coding cost are calculated. When both the weighted frequency "$H_{hist}$" and the weighted frequency "$V_{hist}$" are larger than the threshold value, the prediction operations are carried out respectively in respect of vertical and horizontal directions. Also, in such a case that a difference value between these weighting frequencies "$H_{hist}$" and "$V_{hist}$" is smaller than another threshold value "$\theta_{pred}$", both a DC prediction and a plane-wise prediction are carried out. As previously explained, since the mode selecting operation of the 16×16 prediction is carried out by employing both a frequency histogram and dispersion based upon the mode information of the 4×4 prediction, the calculation amount required for producing the prediction signal is suppressed, and further, the hardware cost is reduced. Alternatively, the respective threshold values may be varied depending upon the value of the quantizing step.

The 4×4 prediction has the prediction directions every 22.5 degrees, whereas the 16×16 prediction has only the predictions along directions of 90-degree intervals; namely, only the vertical prediction, the horizontal prediction, the plane prediction, and the DC prediction. As a consequence, in order to increase the judging precision as to the vertical prediction and the horizontal prediction, the constants "a", "b", "c" of the formula 6 are weighted. In this case, these constants "a", "b", "c" may satisfy such a relationship defined by a>b>c>0.

When to make the plane prediction, weighted frequencies along a diagonal direction may be alternatively considered.

$$D_{hist} = \sum_{s}^{s=9} \gamma(M_s), \quad [\text{Formula 7}]$$

$$\gamma(M_s) = \begin{cases} a & \text{if } (M_s = 3) \\ b & \text{if } (M_s = 7, 8) \\ c & \text{if } (M_s = 0 \text{ or } M_s = 1) \\ 0 & \text{others} \end{cases}$$

Fourth Embodiment

Next, a description is made of a fourth embodiment as to such a coding system in which an in-frame coding operation and an inter-frame coding operation are mixed with each other.

Figure 14:
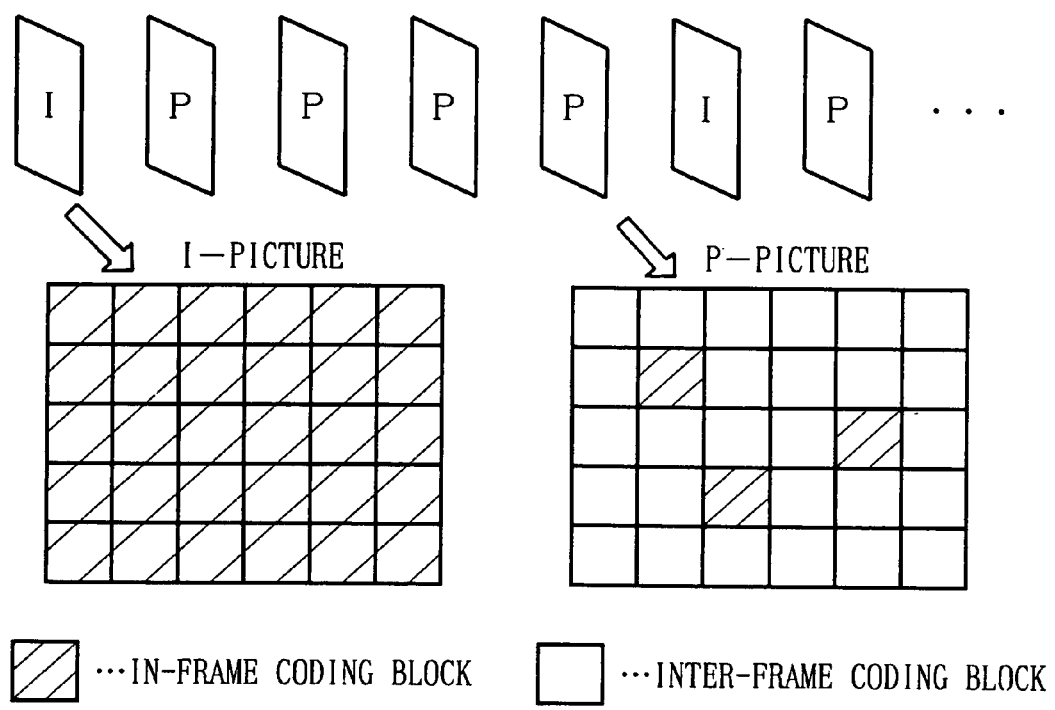
FIG. 14 is a diagram for illustratively showing an example of an in-frame/inter-frame coding slice mixture according to the fourth embodiment.

In general, a motion compensation predicting operation is carried out and a compressing operation along a time direction is carried out in an inter-frame coding operation, so that a code amount thereof is smaller than that of an in-frame coding operation. FIG. 14 illustratively shows an example in which an in-frame coding mode and an inter-frame coding mode are mixed with each other.

In an I-picture corresponding to an in-frame coded picture, since all macroblocks are coded by the in-frame prediction coding operation, a calculation amount thereof is small. In contrast, in a P-picture (otherwise, B-picture which can be predicted in dual directions) corresponding to an inter-frame coded picture, an in-frame coded macroblock is mixed with an inter-frame coded macrblock for each of the macroblocks. A calculation amount of the inter-frame coded macroblock is larger than a calculation amount of the in-frame coded macroblock. Generally speaking, furthermore, in the P-picture (or B-picture), the inter-frame coding mode tends to be selected, the code amount of which is smaller than that of the inter-frame coding mode. As a consequence, in the inter-frame coded picture, or the inter-frame coding operation executed in an inter-frame coded slice, a high precision mode judging operation is carried out, whereas a rough mode judging operation in the inter-frame coding operation is carried out so as to realize a high speed mode judging operation.

For instance, since the mode judging operation by way of the rough-estimate coding cost without using the above-described Lagrange cost is carried out, the inter-frame coding operation is performed in a high speed, while the coding efficiency is not lowered.

Figure 12:
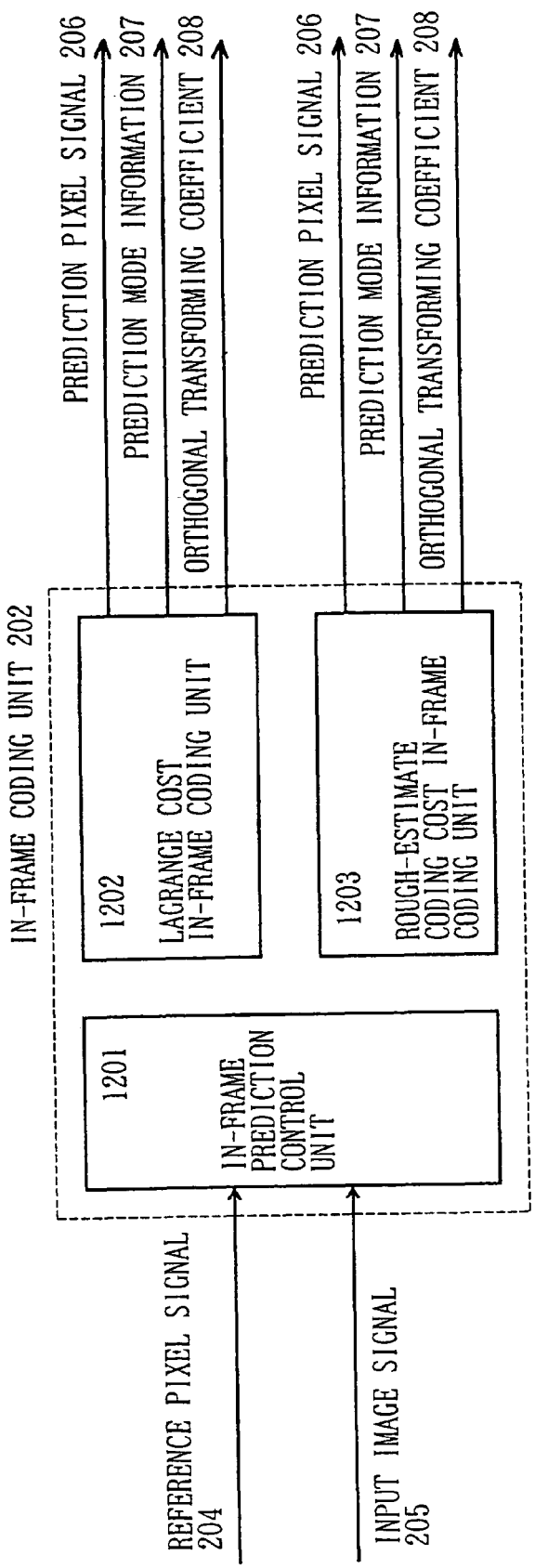
FIG. 12 is a schematic block diagram for indicating an example as to a high speed process operation of an in-frame coding operation by a predict signal producing unit according to a fourth embodiment of the present invention.

FIG. 12 shows one example of this fourth embodiment.

FIG. 12 indicates an internal construction of the in-frame coding unit 202.

An in-frame prediction control unit 1201 is connected to a Lagrange cost in-frame coding unit 1202 and a rough-estimate coding cost in-frame coding unit 1203 respectively; and accepts both the reference pixel signal 204 and the input image signal 205 as the input signals. The in-frame prediction control unit 1201 accepts a present slice type from the coding control unit 111; when this received slice type corresponds to the in-frame coding picture and the in-frame coding slice, the in-frame prediction control unit 1201 selects the Lagrange cost in-frame coding unit 1202; and thus, performs a coding operation by way of the high precision mode judging operation using the Lagrange cost. On the other hand, when the inter-frame coded picture and the inter-frame coded slice are selected, the in-frame prediction control unit 1201 selects the rough-estimate coding cost in-frame coding unit 1203; and thus, performs a coding operation by way of the high speed mode judging operation using the rough-estimate coding cost. As previously explained, since the mode judging operations of the in-frame coding unit are switched based upon the picture type and the slice type, the suitable coding operation is carried out without lowering the coding efficiency.

Fifth Embodiment

In a fifth embodiment of the present invention, a description is made of the following system. That is, as to such a coding system in which an in-frame coding operation and an inter-frame coding operation are mixed with each other a rough mode judging operation is firstly carried out for each of the macroblocks; and then, a judgement is made as to whether an in-frame coding operation, or an inter-frame coding operation is to be carried out.

(1) Internal Arrangement of Prediction Signal Producing Unit 108

Figure 13:
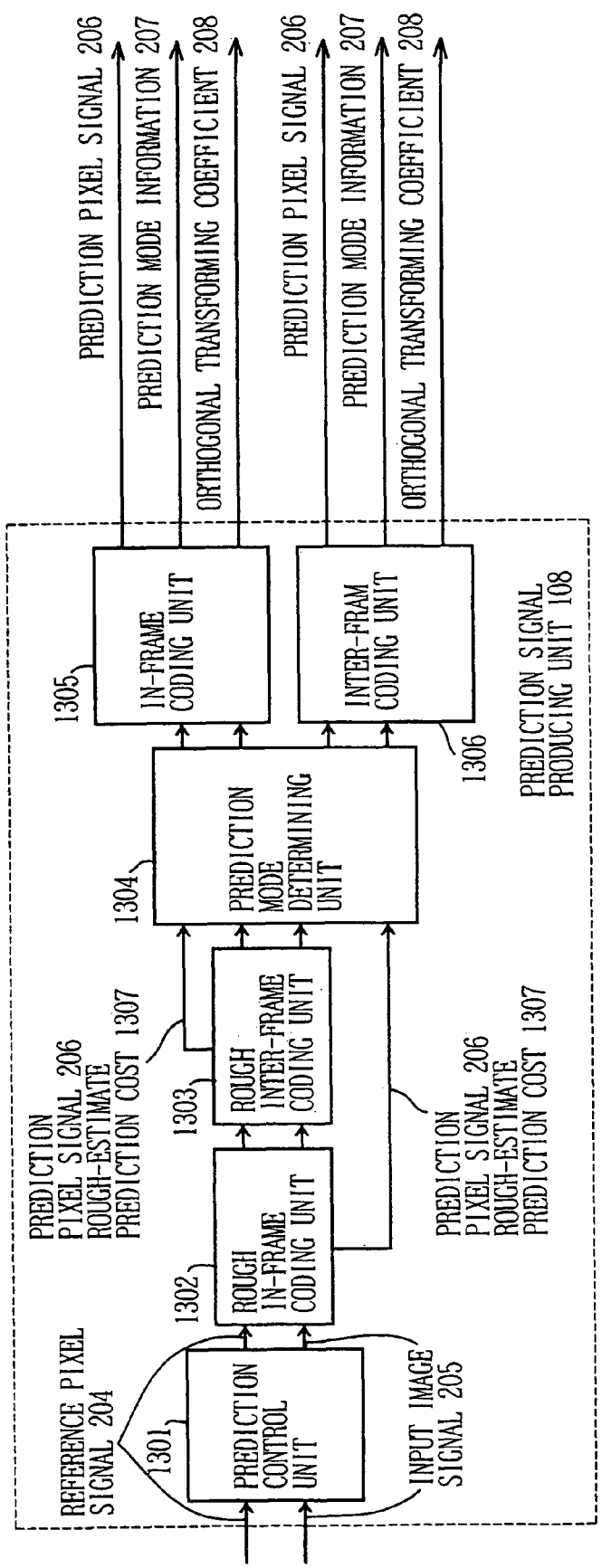
FIG. 13 is a schematic block diagram for indicating an example as to a high speed process operation of a prediction signal producing unit according to a fifth embodiment of the present invention.
Figure 18:
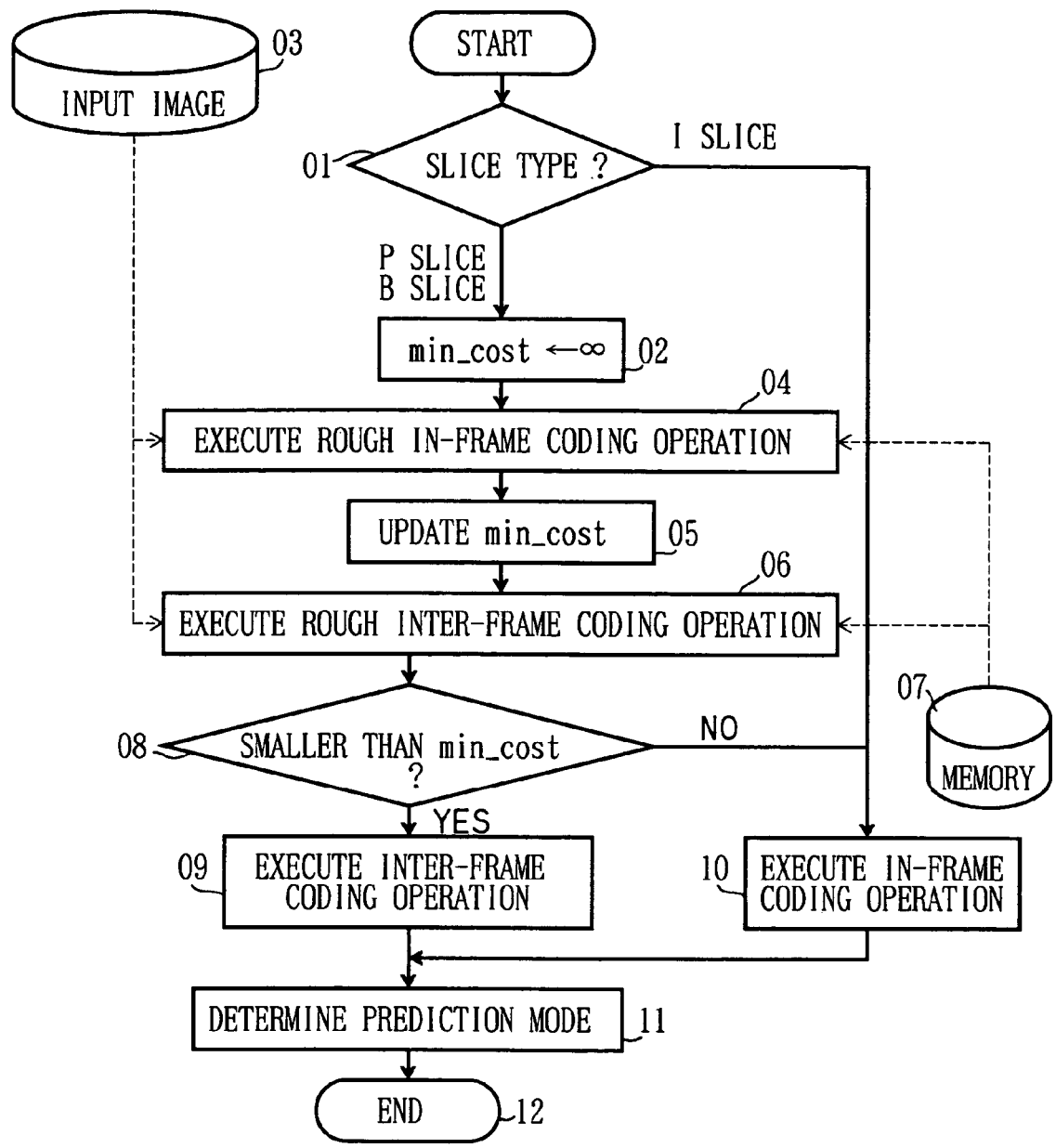
FIG. 18 is a flow chart for explaining an example of a high speed coding operation in an in-frame/inter-frame mixture coding operation according to the fifth embodiment.

FIG. 13 shows an outline of this fifth embodiment, and an internal arrangement the prediction signal producing unit 108 of FIG. 1. FIG. 18 is a flow chart for explaining operations of the prediction signal producing unit 108.

A prediction control unit 1301 is connected to a rough in-frame coding unit 1302, and executes a coding control operation by inputting thereinto both the reference pixel signal 204 and the input image signal 205. Both the rough in-frame coding unit 1302 and a rough inter-frame coding unit 1303 input thereinto both the reference pixel signal 204 and the input image signal 205, produces a prediction signal, and measures a rough-estimate coding cost 1307. These rough in-frame coding unit 1302 and the rough inter-frame coding unit 1303 are connected to a prediction mode determining unit 1304. The prediction mode determining unit 1304 is connected to both an in-frame coding unit 1305 and an inter-frame coding unit 1306.

The rough in-frame coding unit 1302 performs an in-frame prediction operation, and measures a cost by executing a mode judging operation using a rough-estimate coding cost. Thereafter, the rough inter-frame coding unit 1303 performs an inter-frame prediction operation, and measures a cost by executing a mode judging operation using a rough-estimate coding cost. Each of the rough in-frame coding unit 1302 and the rough inter-frame coding unit 1303 outputs both a prediction pixel signal 206 and a rough-estimate coding cost 1307 to a prediction mode determining unit 1304. The prediction mode determining unit 1304 judges the in-frame/inter-frame coding operations by employing the input rough-estimate coding cost 1307; and then, executes a final coding operation in such an in-frame/inter-frame coding mode which is judged as a suitable mode. Any of the rough in-frame coding operation and the rough inter-frame coding operation may be firstly carried out.

In both the in-frame coding operation and the inter-frame coding operation, a coding efficiency is maintained by employing the mode judging operation by use of a rate-distortion-wise optimization. As previously explained, coding modes suitable for high-speed operation are determined for each of the macroblocks on beforehand by use of the rough-estimate coding cost; and then, among the selected coding modes, the optimum coding mode is selected by using the Lagrange cost, so that the high speed coding operation is carried out without lowering the coding efficiency.

(2) Processing Method

In accordance with the flow chart of FIG. 18, a present slice type is firstly judged (step 01). In the case that this judgement result is an in-frame coded slice (I-slice), since the inter-frame coding operation is not executed, an in-frame coding operation is carried out (step 10). In the case that the judgment result is an inter-frame coded slice (P-slice and B-slice), a variable "min_cost" for updating a minimum rough-estimate coding cost is initialized (step 02). A rough in-frame coding operation is carried out based upon an input image 03 and a reference pixel signal supplied from a memory 07 (step 04). The variable "min_cost" is updated by employing the measured minimum rough-estimate coding cost (step 05). Furthermore, a rough inter-frame coding operation is carried out (step 06). A judgement is made as to whether or not the minimum rough-estimate coding cost of the inter-frame coding operation, which has been measured in this processing method, is smaller than the variable "min_cost" (step 08). In the case that this judgement result become YES, the inter-frame coding operation is carried out (step 09), and then, an optimum coding mode is determined by employing the rate-distortion-wise optimization (step 11). In the case that this judgement result become NO, the in-frame coding operation is carried out (step 10); and then, an optimum coding mode is determined (step 11).

INDUSTRIAL APPLICABILITY

The present invention may be advantageously applied to techniques capable of compressing moving pictures and of transmitting and recording the compressed moving pictures.

What is claimed is:

1. A method for encoding a moving picture, comprising:
supplying the moving picture to a moving picture coding device;
generating from the moving picture a plurality of prediction signals of a pixel block in an input picture by performing prediction in accordance with a plurality of prediction modes;
generating a plurality of prediction residual signals between the pixel block and each of the plurality of prediction signals;
estimating a plurality of first coding costs from the plurality of prediction residual signals and code amounts of prediction mode information, the prediction mode information indicating the plurality of prediction modes, each of the plurality of first coding costs being estimated for each of the plurality of prediction modes;
selecting a plurality of prediction mode candidates from the plurality of prediction modes in ascending order of the plurality of first coding costs, the plurality of prediction mode candidates corresponding in number to a quantization step width;
obtaining a plurality of coding distortions and a plurality of code amounts for the plurality of prediction mode candidates by coding the plurality of pixel blocks in accordance with the prediction mode candidates;
estimating second coding costs for the prediction mode candidates based on the coding distortions and the code amounts for the prediction mode candidates; and selecting a prediction mode from the prediction mode candidates based on the second coding costs, the pixel block being coded in accordance with the selected one prediction mode in order to produce an encoded moving picture from the moving picture coding device, wherein the selecting the prediction mode candidates obtains the number of the prediction mode candidates by a relationship between the number of the prediction mode candidates and the quantization step width on the basis of correlation between the quantization step width and a coincident ratio of the first coding costs and the second coding costs.

2. The method according to claim 1, wherein the number of the prediction mode candidates increases or decreases in response of increasing or decreasing of the quantization step width.

3. A method for encoding a moving picture, comprising:
supplying the moving picture to a moving picture coding device;
generating from the moving picture a plurality of prediction signals of a pixel block in an input picture by performing prediction in accordance with a plurality of prediction modes;
generating a plurality of prediction residual signals between the pixel block and each of the plurality of prediction signals;
estimating a plurality of first coding costs from the plurality of prediction residual signals and code amounts of prediction mode information, the prediction mode information indicating the plurality of prediction modes, each of the plurality of first coding costs being estimated for each of the plurality of prediction modes;
selecting a plurality of prediction mode candidates from the plurality of prediction modes in ascending order of the plurality of first coding costs, the plurality of prediction mode candidates corresponding in number to a quantization step width;
obtaining a plurality of coding distortions and a plurality of code amounts for the plurality of prediction mode candidates by coding the plurality of pixel blocks in accordance with the prediction mode candidates;
estimating second coding costs for the prediction mode candidates based on the coding distortions and the code amounts for the prediction mode candidates; and
selecting a prediction mode from the prediction mode candidates based on the second coding costs, the pixel block being coded in accordance with the selected one prediction mode in order to produce an encoded moving picture from the moving picture coding device,
wherein the selecting the prediction mode candidates selects the prediction mode candidates having the second coding costs smaller than a threshold, the threshold being given by monotonic function of the quantization step width.

4. An apparatus for encoding a moving picture, comprising:
a prediction unit configured to generate a plurality of prediction signals of a pixel block in an input picture by performing prediction in accordance with a plurality of prediction modes;
a prediction residual generating unit configured to generate a plurality of prediction residual signals between the pixel block and each of the plurality of prediction signals;
a first cost estimating unit configured to estimate a plurality of first coding costs from the plurality of prediction residual signals and code amounts of prediction mode information, the prediction mode information indicating the plurality of prediction modes, each of the plurality of first coding costs being estimated for each of the plurality of prediction modes;
a first selecting unit configured to select a plurality of prediction mode candidates from the plurality of prediction modes in ascending order of the plurality of first coding costs, plurality of the prediction mode candidates corresponding in number to a quantization step width;
an encoding unit configured to obtaining a plurality of coding distortions and a plurality of code amounts for the plurality of prediction mode candidates by encoding the plurality of pixel blocks in accordance with the prediction mode candidates;
a second cost estimating unit configured to estimate second coding costs for the prediction mode candidates based on the coding distortions and the code amounts for the prediction mode candidates; and
a second selecting unit configured to select a prediction mode from the prediction mode candidates based on the second coding costs, the pixel block being coded in accordance with the selected one prediction mode,
wherein the first selecting unit obtains the number of the prediction mode candidates by a relationship between the number of the prediction mode candidates and the quantization step width on the basis of correlation between the quantization step width and a coincident ratio of the first coding costs and the second coding costs.

5. The apparatus according to claim 4, wherein the number of the prediction mode candidates increases or decreases in response of increasing or decreasing of the quantization step width.

6. An apparatus for encoding a moving picture, comprising:
a prediction unit configured to generate a plurality of prediction signals of a pixel block in an input picture by performing prediction in accordance with a plurality of prediction modes;
a prediction residual generating unit configured to generate a plurality of prediction residual signals between the pixel block and each of the plurality of prediction signals;
a first cost estimating unit configured to estimate a plurality of first coding costs from the plurality of prediction residual signals and code amounts of prediction mode information, the prediction mode information indicating the plurality of prediction modes, each of the plurality of first coding costs being estimated for each of the plurality of prediction modes;
a first selecting unit configured to select a plurality of prediction mode candidates from the plurality of prediction modes in ascending order of the plurality of first coding costs, plurality of the prediction mode candidates corresponding in number to a quantization step width;
an encoding unit configured to obtaining a plurality of coding distortions and a plurality of code amounts for the plurality of prediction mode candidates by encoding the plurality of pixel blocks in accordance with the prediction mode candidates;
a second cost estimating unit configured to estimate second coding costs for the prediction mode candidates based on the coding distortions and the code amounts for the prediction mode candidates; and
a second selecting unit configured to select a prediction mode from the prediction mode candidates based on the second coding costs, the pixel block being coded in accordance with the selected one prediction mode, wherein the selecting unit selects the prediction mode candidates having the second coding costs smaller than a threshold, the threshold being given by monotonic function of the quantization step width.

* * * * *